(12) United States Patent
Ichino

(10) Patent No.: US 9,785,181 B2
(45) Date of Patent: Oct. 10, 2017

(54) POWER NETWORK SYSTEM OPERATION METHOD

(71) Applicant: NEC Corporation, Tokyo (JP)

(72) Inventor: Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 264 days.

(21) Appl. No.: 14/760,724

(22) PCT Filed: Nov. 28, 2013

(86) PCT No.: PCT/JP2013/006988
§ 371 (c)(1),
(2) Date: Jul. 14, 2015

(87) PCT Pub. No.: WO2014/111995
PCT Pub. Date: Jul. 24, 2014

(65) Prior Publication Data
US 2015/0355666 A1    Dec. 10, 2015

(30) Foreign Application Priority Data

Jan. 15, 2013    (JP) ................................. 2013-004770

(51) Int. Cl.
*G05F 5/00*     (2006.01)
*H02J 4/00*     (2006.01)
(Continued)

(52) U.S. Cl.
CPC ............... *G05F 5/00* (2013.01); *G06Q 50/06* (2013.01); *H02J 3/36* (2013.01); *H02J 4/00* (2013.01);
(Continued)

(58) Field of Classification Search
CPC . G05F 5/00; H02J 4/00; H02J 13/0003; H02J 3/36; G06Q 50/06; Y10T 307/549; Y02E 60/60
(Continued)

(56) References Cited

U.S. PATENT DOCUMENTS 9,013,902 B2 *    4/2015    Abe ........................ H02J 3/00
                                                                           307/31
2012/0173035 A1    7/2012    Abe

FOREIGN PATENT DOCUMENTS

JP    2011-61970    3/2011
JP    4783453      9/2011

OTHER PUBLICATIONS

Website reference of the Digital Grid Consortium (http://www.digitalgrid.org/jp/).
(Continued)

*Primary Examiner* — Jared Fureman
*Assistant Examiner* — Michael Warmflash
(74) *Attorney, Agent, or Firm* — Finnegan, Henderson, Farabow, Garrett & Dunner, L.L.P.

(57) ABSTRACT

The purpose of the invention is to provide a guideline for, when adding a new power cell to a power network, solving the problem of how to set an operation mode of a power conversion leg. Assuming that a power conversion leg (JRL) of the power router (JR) of a power cell (J) and a power conversion leg (KRL) of the power router (KR) of a power cell (K) are connected to each other and power is transferred from the power cell (J) to the power cell (K) when the utility grid breaks down, the leg operation modes of the leg (JRL) of the power router (JR) and leg (KRL) of the power router (KR) are set as follows:
the power conversion leg (JRL) of the power router (JR) is set to a stand-alone mode; and the power conversion leg (KRL) of the power router (KR) is set to a designate power
(Continued)

transmission/reception mode when the utility grid does not break down and to a master mode from the designate power transmission/reception mode when the utility grid breaks down.

4 Claims, 40 Drawing Sheets

(51) Int. Cl.
 *H02J 3/36* (2006.01)
 *G06Q 50/06* (2012.01)
 *H02J 13/00* (2006.01)
(52) U.S. Cl.
 CPC ........... *H02J 13/0003* (2013.01); *Y02E 60/60* (2013.01); *Y10T 307/549* (2015.04)
(58) Field of Classification Search
 USPC .......................................................... 307/52
 See application file for complete search history.

(56) References Cited

OTHER PUBLICATIONS

International Search Report mailed Mar. 4, 2014 in corresponding PCT International Application.

* cited by examiner

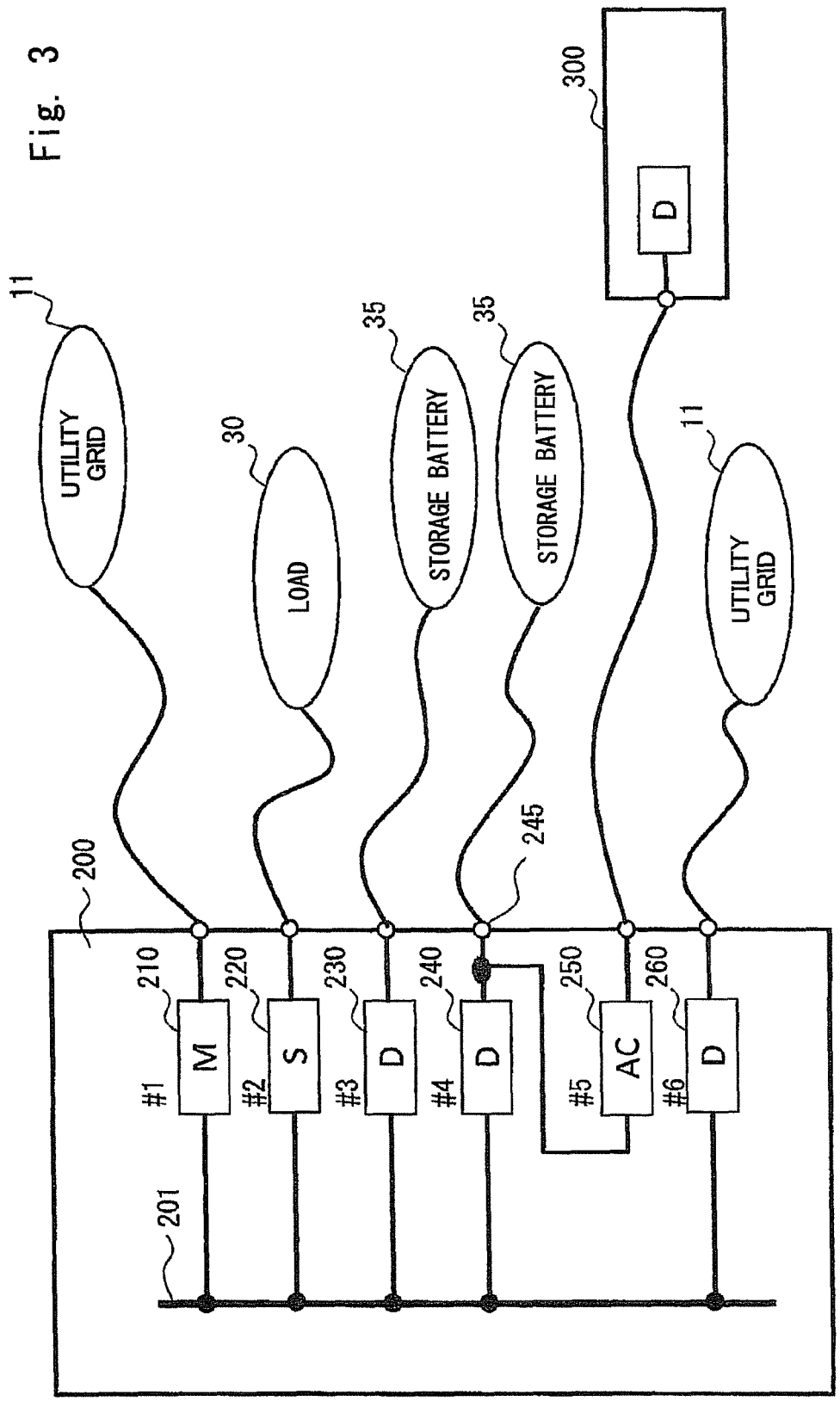

| FIRST POWER ROUTER \ SECOND POWER ROUTER | MASTER LEG | DESIGNATED POWER TRANSMISSION/RECEPTION LEG | STAND-ALONE LEG | AC-THROUGH |
|---|---|---|---|---|
| MASTER LEG | UNCONNECTABLE | UNCONNECTABLE | CONNECTABLE | CONNECTABLE |
| DESIGNATED POWER TRANSMISSION/RECEPTION LEG | UNCONNECTABLE | UNCONNECTABLE | CONNECTABLE | CONNECTABLE |
| STAND-ALONE LEG | CONNECTABLE | CONNECTABLE | UNCONNECTABLE | CONNECTABLE |
| AC-THROUGH | CONNECTABLE | CONNECTABLE | CONNECTABLE | IN VAIN EVEN WHEN BEING CONNECTED |

Fig. 8

| POWER CELL ID | DEMANDED POWER | SUPPLIED POWER | EXCESSIVE POWER | PLACE |
|---|---|---|---|---|
| CELL 1 | | | | |
| CELL 2 | | | | |
| CELL 3 | | | | |
| ... | | | | |
| CELL K | | | | |
| ... | | | | |

Fig. 26

| POWER CELL ID | DEMANDED POWER | SUPPLIED POWER | EXCESSIVE POWER | PLACE |
|---|---|---|---|---|
| CELL N | — | — | — | — |

Fig. 27

| POWER CELL ID | DEMANDED POWER | SUPPLIED POWER | EXCESSIVE POWER | PLACE | COST | EFFICIENCY OF POWER TRANSMISSION |
|---|---|---|---|---|---|---|
| CELL 1 | W | W | + W | | YEN | 0.9 |
| CELL 2 | | | − W | | | 0.8 |
| CELL 3 | | | | | | |
| ... | | | | | | |
| CELL K | | | | | | |
| ... | | | | | | |
| CELL N (NEWLY ADDED CELL) | | | | | | |

Fig. 28

POWER NETWORK SYSTEM OPERATION METHOD

TECHNICAL FIELD

The present invention relates to a power network system which is formed by asynchronously interconnecting a plurality of power cells and, particularly, to a method for operating the power network system.

BACKGROUND ART

When a power supply system is constructed, in addition to a further expansion of a power distribution grid in a more stable way, a main issue has been providing such a system with a capability of introducing a large amount of natural energy. A power network system called Digital Grid (registered trademark) has been proposed as a new power network (see Patent literature 1: Japanese Patent No. 4783453, Non-patent literature 1: Website of Digital Grid Consortium, http://www.digitalgrid.org/index.php/jp/).

Digital Grid (registered trademark) is a power network system in which a power network is partitioned into small-sized cells and these cells are asynchronously interconnected. Each power cell may be small (e.g., a house, a building, or a commercial facility) or may be large (e.g., a prefecture or a municipality). Each power cell naturally includes a load, and may also include a power generation facility or a power storage system. The power generation facility may be, as an example, a power generation facility that uses natural energy generated by, for example, photovoltaic power, wind power, and geothermal power.

In order to freely generate power inside each power cell and to further smoothly interchange power among the power cells, the power cells are asynchronously connected. (That is, even when the plurality of power cells are interconnected, a frequency, a phase, and a voltage of power used in each power cell is asynchronous with those used in other power cells.)

FIG. 33 shows an example of a power network system 10. In FIG. 33, a utility grid 11 sends bulk power from a large-scale power plant 12. A plurality of power cells 21-24 is arranged. Each of the power cells 21-24 includes a load such as a house 31 and a building 32, power generation facilities 33 and 34, and a power storage system 35.

The power generation facility may include, as an example, a solar panel 33 and a wind turbine 34.

The power storage system is, for example, a storage battery 34.

In this specification, the power generation facility and the power storage system may be collectively called a distributed power supply.

Further, the power cells 21-24 respectively include power routers 41-44 which serve as connection ports to be connected to other power cells or the utility grid 11.

Each of the power routers 41-44 includes a plurality of legs (LEG). (Due to space constraints, the symbols for the legs are omitted in FIG. 10. It should be interpreted that the white circles attached to the power routers 41-44 are connection terminals of each leg.)

Now, each leg includes a connection terminal and a power conversion unit, and an address is attached to each leg. The power conversion by the leg means converting AC to DC or DC to AC and changing the phase, the frequency, and the voltage of the power.

All the power routers 41-44 are connected to a management server 50 by a communication network 51, and operations of all the power routers 41-44 are integrally controlled by the management server 50. For example, the management server 50 instructs each of the power routers 41-44 to transmit or receive power for each leg using the address attached to each leg. Accordingly, power is interchanged among power cells through the power routers 41-44.

Since power interchange among the power cells is achieved, a plurality of power cells can share, for example, one power generation facility 33 or 34 or one power storage system 35. If an excessive power can be interchanged among the power cells, a supply-demand balance of power can be kept stable while greatly reducing the equipment cost.

CITATION LIST

Patent Literature

[Patent literature 1] Japanese Patent No. 4783453

Non Patent Literature

[Non Patent Literature 1] Website of the Digital Grid Consortium (http://www.digitalgrid.org/index.php/jp/)

SUMMARY OF INVENTION

Technical Problem

One of the advantages of the power interchange between the power cells being possible is a response that can be made in the case of a power failure. That is, even if the utility grid breaks down due to the power failure, it is expected to be possible to avoid a large-scale blackout occurring by interchanging excessive power between power cells mutually. However, it is not always true that the power is transferred to one power cell from the adjacent power cell in an emergency. That is, because it is not realistic to install power generation facilities and power storage units in most of the power cells to generate excessive power in terms of cost, it is not always at all certain that the adjacent power cell has excessive power. Therefore, in the case of providing a new power cell in the power network, it is necessary to anticipate appropriately from which power cell the power should be received in the case of a power failure and to consider to which power cells the new power cell should be connected to.

An object of the invention is to provide a guideline for solving the problem of how to set an operation mode of a power conversion leg when adding a new power cell to the power network.

Solution to Problem

A method for operating a power network system which includes a plurality of power cells having a power router for connecting to an external power system asynchronously and is constituted by connecting the plurality of power cells,
wherein
the power router includes;
a direct current bus maintaining a voltage at a predetermined rated voltage, and
a power conversion leg having one connection end which is connected to the direct current bus and the other connection end which is connected to an external connection partner as an external connection terminal, and having a function of converting the power bi-directionally between the one connection end and the other connection end, and wherein the power conversion leg is operatively controlled in either one operation mode out of a master mode if the voltage of the direct current bus decrease from the rated voltage, a shortage of the power is compensate from the connection partner, and if the voltage of the direct current bus increase from the rated voltage, an excessive power is transferred to the connection partner, a designate power transmission/reception mode in which a designated power is transferred to the connection partner or the designated power is received from the connection partner, and a stand-alone mode in which a voltage with designated amplitude and frequency is produced by itself and is transferred/received between the connection partner, characterized in that in case a first power conversion leg of a first power router and a second power conversion leg of a second power router are connected, the first power router and the second power router cannot receive a power supply from the utility grid, and the power is transferred by transmitting electricity from the first power conversion leg of the first power router to the second power conversion leg of the second power router, when there is the power supply from the utility grid, the operation mode of the first power conversion leg of the first power router is set to the stand-alone, and the operation mode of the second power conversion leg of a second power router is set to the designate power transmission/reception mode, when there is not the power supply from the utility grid, the operation mode of the first power conversion leg of the first power router is set to the stand-alone, and the operation mode of the second power conversion leg of the second power router is set to the master mode.

Advantageous Effects of Invention

By setting the operation mode of the leg in a proper manner, it is possible to respond rapidly to a power failure and to avoid a situation where the power cells undergo the power failure.

BRIEF DESCRIPTION OF DRAWINGS

FIG. 3 is a diagram showing one example in which the power router is connected to a utility grid, a load, and various distributed power supplies;

FIG. 8 is a diagram showing patterns of a combination of power routers when the power routers are connected to each other;

FIG. 26 is a table showing an example of information table of an existing power network;

FIG. 27 is a table showing an example of information table of a new power network;

FIG. 28 is a table showing a general information table;

DESCRIPTION OF EMBODIMENTS (Description of a Power Router and a Power Network System)

The present invention is for transmitting power efficiently between power cells and for enabling a power network system to be optimally operated. As a condition for this, the power network system uses a power router. However, since the power router and the power network system using the power router is not yet a known technique, first, the power router and the power network system using the power router will be described.

Figure 1:
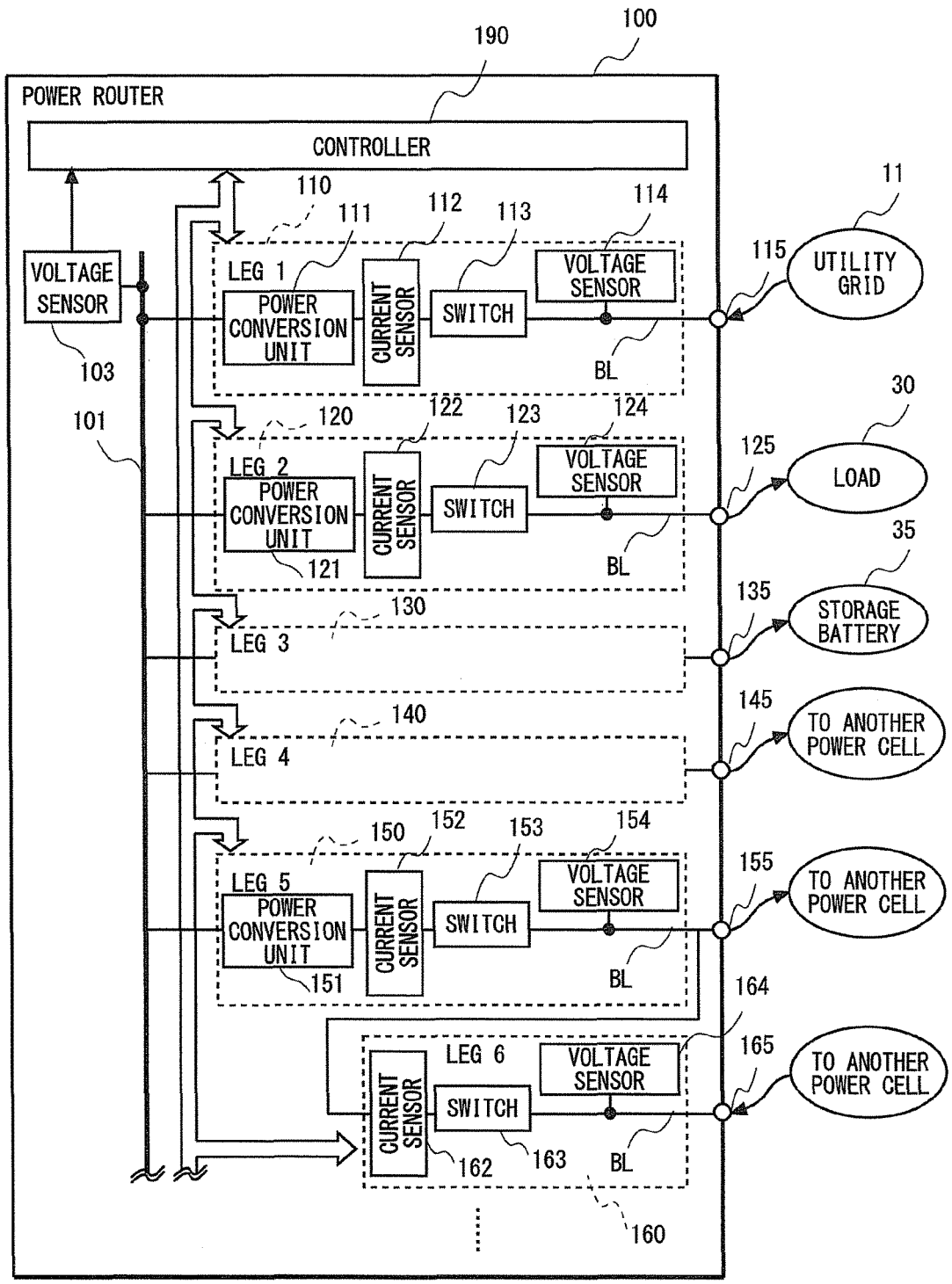
FIG. 1 is a diagram showing a schematic configuration of a power router.
Figure 2:
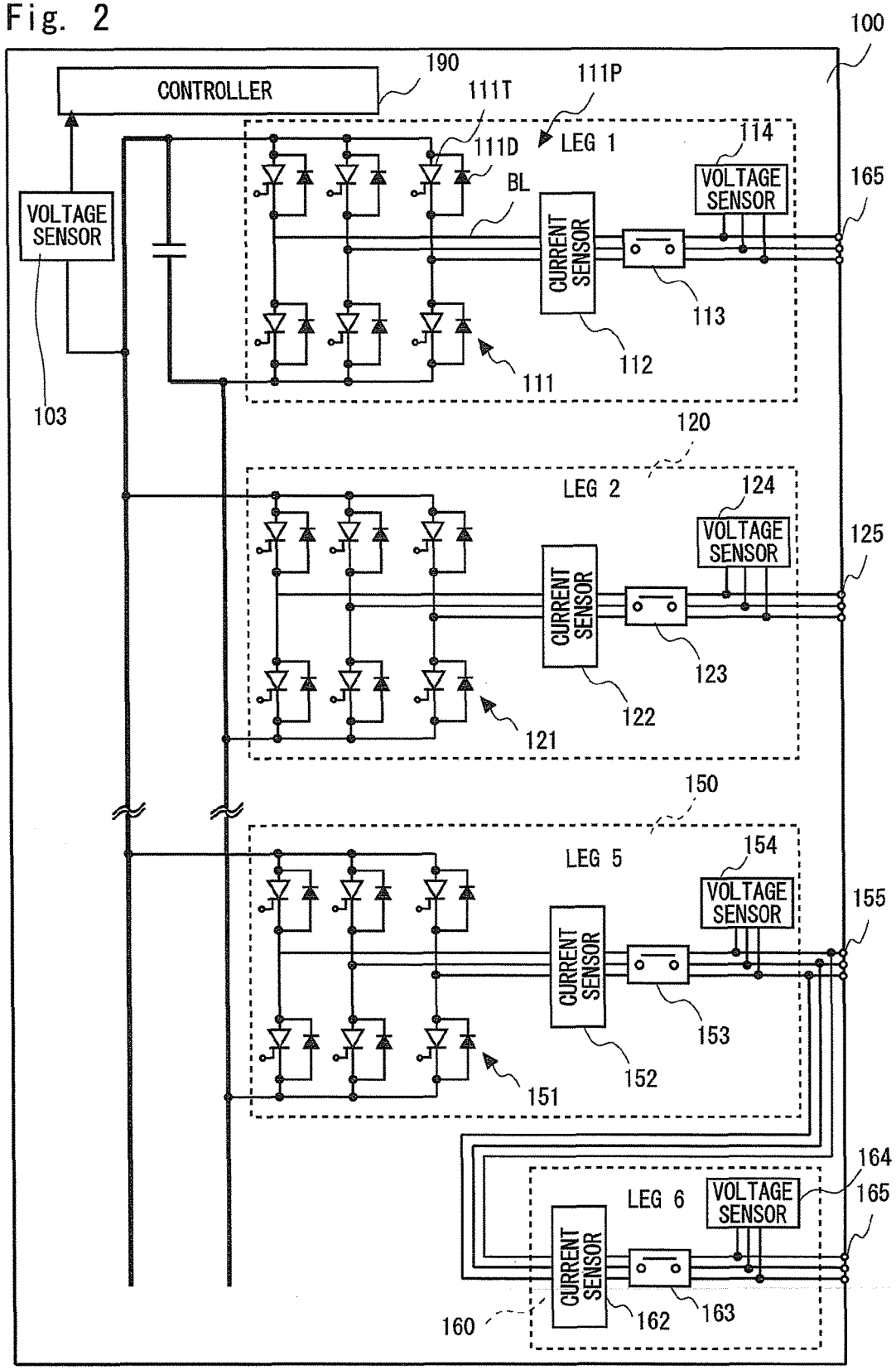
FIG. 2 is a diagram showing the details of an internal configuration of the power router.

FIG. 1 is a diagram showing a schematic configuration of a power router 100. FIG. 2 is a diagram showing the details of an internal configuration of the power router 100. The power router 100 typically includes a DC bus 101, a plurality of legs 110-160, and a controller 190.

The power router 100 includes the DC bus 101 to which the plurality of legs 110-160 are connected in parallel. The DC bus 101 is provided to enable DC power flow, and a voltage of the DC bus 101 is controlled to be constant. (How the voltage of the DC bus 101 is kept constant will be described later.) The power router 100 is connected to the outside through each of the legs 110-160. All the power to be exchanged with the outside is once converted into DC and the DC flows through the DC bus 101. Since power is once converted into DC, it is possible to asynchronously connect power cells without any consideration for the differences in the phase, the voltage, or the frequency thereof. It is assumed here that the DC bus 101 is, as shown in FIG. 2, a parallel type including a smoothing capacitor 102. A voltage sensor 103 is connected to the DC bus 101, and a voltage value of the DC bus 101 detected by the voltage sensor 103 is sent to the controller 190.

Next, the plurality of legs 110-160 will be described. The plurality of legs 110-160 are provided in parallel with the DC bus. In FIG. 1, six legs 110-160 are shown. The six legs 110-160 are represented, as shown in FIG. 1, as a first leg 110, a second leg 120, . . . , and a sixth leg 160. In FIG. 1, due to space constraints, the first leg 110 is denoted by a leg 1 and the second leg 120 is denoted by a leg 2, for example. Further, in FIG. 2, the third leg 130 and the fourth leg 140 are omitted.

While the first leg 110 to the fifth leg 150 have the same configuration, the sixth leg 160 is different from the first to fifth legs 110-150 in that the sixth leg 160 does not include a power conversion unit. First, the configuration of the first leg 110 to the fifth leg 150 will be described. Since the first leg 110 to the fifth leg 150 have the same configuration, just the configuration of the first leg 110 will be described as an example. The first leg 110 includes a power conversion unit 111, a current sensor 112, a switch 113, a voltage sensor 114, and a connection terminal 115. The power conversion unit 111 converts AC power to DC power or DC power to AC power. Since DC power flows through the DC bus 101, the power conversion unit 111 converts DC power flowing through the DC bus 101 to AC power having a predetermined frequency and voltage to allow the AC power to flow to the outside from the connection terminal 115. Otherwise, the power conversion unit 111 converts AC power that flows from the connection terminal 115 into DC power to allow the DC power to flow through the DC bus 101.

The power conversion unit 111 has a configuration of an inverter circuit in which anti-parallel circuits 111P formed of thyristors 111T and feedback diodes 111D are three-phase bridge-connected. (That is, six anti-parallel circuits 111P are provided for one inverter circuit.) While the power conversion unit 111 is a three-phase inverter circuit since the three-phase AC is used in this example, a single-phase inverter circuit may be used instead. A line that is drawn from a node between two anti-parallel circuits 111P and connects the node and the connection terminal is called a branch line BL. (Since the three-phase AC is used, one leg includes three branch lines BL.)

The direction of the power, the frequency of the AC power and the like are controlled by the controller 190. That is, switching operations of the thyristors 111T are controlled by the controller 190. The operation control by the controller 190 will be described later.

The switch 113 is provided between the power conversion unit 111 and the connection terminal 115. The branch line BL is opened or closed by the operation of the switch 113, which means the connection between the outside and the DC bus 101 is broken or established. Further, the voltage of the branch line BL is detected by the voltage sensor 114 and the current value of the current flowing through the branch line BL is detected by the current sensor 112. The switching operation of the switch 113 is controlled by the controller 190 and the values detected by the voltage sensor 114 and the current sensor 112 are outputted to the controller 190.

While the power conversion unit is the inverter circuit and the connection partner of the leg uses AC as described above, the connection partner of the leg may instead use DC and may be, for example, a storage battery 35. (For example, in FIG. 1, the third leg 130 is connected to the storage battery 35.) The power conversion in this case is DC-DC conversion. Accordingly, it is possible to provide an inverter circuit and a converter circuit in parallel in the power conversion unit and separately use the inverter circuit and the converter circuit depending on whether the connection partner is AC or DC. Otherwise, a leg dedicated for DC-DC conversion in which the power conversion unit is a DC-DC conversion unit may be provided. It will be often advantageous in terms of the size and the cost to use a power router that includes both a leg dedicated for AC-DC conversion and a leg dedicated for DC-DC conversion instead of providing the inverter circuit and the converter circuit in parallel in each leg.

The first leg 110 to the fifth leg 150 have the same configuration stated above.

Next, the sixth leg 160 will be described. The sixth leg 160 does not include a power conversion unit, which means a connection terminal 165 of the sixth leg 160 is not connected to the DC bus 101. The sixth leg 160 is connected to the branch line BL of the fifth leg 150. An internal wire of the sixth leg 160 is also called a branch line BL. The branch line BL of the sixth leg 160 is connected between the connection terminal 155 and the switch 153 of the fifth leg 150.

The sixth leg 160 includes a switch 163, a voltage sensor 164, a current sensor 162, and a connection terminal 165. The branch line BL of the sixth leg 160 is connected to the branch line BL of the fifth leg 150 through the switch 163. That is, the connection terminal 165 of the sixth leg 160 is connected to the connection terminal 155 of the fifth leg 150. Only the switch 163 is provided between the connection terminal 165 of the sixth leg 160 and the connection terminal 155 of the fifth leg 150 and the sixth leg 160 does not include a power converter. Accordingly, power is conducted between the connection terminal 165 of the sixth leg 160 and the connection terminal 155 of the fifth leg 150 without being converted. A leg such as the sixth leg 160 that does not include a power converter may be called an AC-through leg.

The current sensor 162 and the voltage sensor 164 detect a current value and a voltage value of the branch line BL to output the current value and the voltage value to the controller 190. The switching operation of the switch 163 is controlled by the controller 190.

(Operation Modes of Legs)

The first leg 110 to the fifth leg 150 include power converters 111-151 and the switching operations of the thyristors in the power converters are controlled by the controller 190, as already described above. The power router 100 is in the node of the power network 10, and plays an important role of connecting the utility grid 11, the load 30, a distributed power supply, power cells and the like. At this time, the connection terminals 115-165 of the respective legs 110-160 are connected to the utility grid 11, the load 30, the distributed power supply, and power routers of other power cells. The present inventors have noticed that the legs 110-160 have different roles depending on the connection partner and the power routers are not appropriately operated unless each of the legs 110-160 is appropriately operated according to each of their respective roles. While the legs have the same configuration, the present inventors have changed the method of operating the legs depending on the connection partner.

The method of operating the legs is called an operation mode.

The present inventors have prepared three types of operation modes of the legs, and the modes are switched according to the connection partner.

The operation modes of the legs include:

a master mode;

a stand-alone mode; and a designated power transmission/reception mode.

In the following description, these operation modes will be described in series.

(Master Mode)

The master mode is an operation mode when a leg is connected to a stable power supply source such as an electrical grid, and is an operation mode to keep the voltage of the DC bus 101. In FIG. 1, an example in which the connection terminal 115 of the first leg 110 is connected to the utility grid 11 is shown. In the case of FIG. 1, the operation of the first leg 110 is controlled as a master mode, and plays a role of keeping the voltage of the DC bus 101. While many other legs 120-150 are connected to the DC bus 101, power may flow into the DC bus 101 from the legs 120-150 or may flow out from the legs 120-150. When the power flows out through the DC bus 101 and the voltage of the DC bus 101 decreases from the rated voltage, the leg 110 which is in the master mode supplements an insufficient energy due to the outflow from the connection partner (in this example, the utility grid 11). On the other hand, when the power flows into the DC bus 101 and the voltage of the DC bus 101 increases from the rated voltage, the leg 110 which is in the master mode transfers an excessive energy due to the inflow to the connection partner (in this example, the utility grid 11). The leg 110 which is in the master mode is therefore able to keep the voltage of the DC bus 101. Accordingly, in one power router, at least one leg needs to be operated in the master mode. Otherwise, the voltage of the DC bus 101 is not kept constant. In one power router, two or more legs may be operated in the master mode. It is preferable, however, that only one leg be operated in the master mode in one power router. Further, for example, the leg which in the master mode may be connected to the distributed power supply (also including storage batteries) on which a self-commutated inverter is mounted instead of being connected to the utility grid. It is impossible, however, to connect the leg which is in the master mode and the distributed power supply on which an externally commutated inverter is mounted.

In the following description, the leg operated in the master mode may be referred to as a master leg.

The operation control of the master leg will be described. The master leg is started as follows.

First, the switch 113 is set to the opened (broken) state. In this state, the connection terminal 115 is connected to the connection partner. In this embodiment, the connection partner is the utility grid 11.

The voltage sensor 114 measures the voltage of the utility grid of the connection partner and obtains the phase, the frequency, and the amplitude of the voltage of the utility grid using a phase-locked loop (PLL) or the like. After that, the output of the power conversion unit 111 is adjusted so that the voltage of the phase, the frequency, and the amplitude that are obtained is outputted from the power conversion unit 111. That is, the ON/OFF patterns of the thyristors 111T are determined. When this output is made stable, the switch 113 is turned on and the power conversion unit 111 and the utility grid 11 are connected. Since the output of the power conversion unit 111 and the voltage of the utility grid 11 are synchronized at this point, the current does not flow.

The operation control when the master leg is operated will be described.

The voltage of the DC bus 101 is measured by the voltage sensor 103. When the voltage of the DC bus 101 exceeds a predetermined rated bus voltage, the power conversion unit 111 is controlled so that power is sent from the master leg 110 to the utility grid. (At least one of the phase and the amplitude of the voltage outputted from the power conversion unit 111 is adjusted so that power is sent from the DC bus 101 to the utility grid 11 through the master leg 110.) The rated voltage of the DC bus 101 is predetermined.

On the other hand, when the voltage of the DC bus 101 is below the predetermined rated bus voltage, the power conversion unit 111 is controlled so that the master leg 110 is able to receive power from the utility grid 11. (At least one of the phase and the amplitude of the voltage outputted from the power conversion unit 111 is adjusted so that power is sent from the utility grid 11 to the DC bus 101 through the master leg 110.) It will be understood that, according to the operation of the master leg as described above, the voltage of the DC bus 101 can be kept to the predetermined rated voltage.

(Stand-Alone Mode)

The stand-alone mode is an operation mode in which a leg generates a voltage of the amplitude and the frequency specified by the management server 50 by itself, and sends power to and receives power from the connection partner. The stand-alone mode is, for example, an operation mode to supply power to a device such as the load 30 that consumes power. Alternatively, the stand-alone mode is an operation mode to directly receive power sent from the connection partner. FIG. 1 shows an example in which the connection terminal 125 of the second leg 120 is connected to the load 30. The operation of the second leg 120 is controlled as the stand-alone mode and power is supplied to the load 30. Further, when a leg is connected to another power router as in the fourth leg 140 or the fifth leg 150, the fourth leg 140 or the fifth leg 150 may be operated in the stand-alone mode as a mode to send power required by the other power router. Alternatively, when a leg is connected to another power router as in the fourth leg 140 or the fifth leg 150, the fourth leg 140 or the fifth leg 150 may be operated in the stand-alone mode as a mode to receive power sent from the other power router. While it is not illustrated in the drawings, the second leg can be operated in the stand-alone mode also in a case in which the second leg is connected to a power generation facility in place of the load 30. In this case, however, an externally commutated inverter is installed in the power generation facility. The operation mode when the power routers are connected to each other will be described later.

The leg operated in the stand-alone mode is called a stand-alone leg. In one power router, a plurality of stand-alone legs may be provided.

The operation control of the stand-alone leg will be described.

First, a switch 123 is opened (broken). The connection terminal 125 is connected to the load 30. The management server 50 notifies the power router 100 of the amplitude and the frequency of the power (voltage) that should be supplied to the load 30. The controller 190 causes the power (voltage) of the specified frequency and the specified amplitude to be outputted from the power conversion unit 121 to the load 30. (In short, the ON/OFF patterns of the thyristors 121T are determined.) When this output becomes stable, the switch 123 is turned on to connect the power conversion unit 121 and the load 30. Lastly, when the power is consumed in the load 30, the power corresponding to the consumed amount flows out to the load 30 from the stand-alone leg 120.

(Designated Power Transmission/Reception Mode)

A designated power transmission/reception mode is an operation mode for transmitting or receiving a designated energy. Specifically, the designated power transmission/reception mode includes a case in which the designated power is transmitted to the connection partner and a case in which the designated power is received from the connection partner. In FIG. 1, the fourth leg 140 and the fifth leg 150 are connected to other power routers. In such a case, a predetermined energy is fed from the fourth leg 140 or the fifth leg 150 to the other power router or from the other power router to the fourth leg 140 or the fifth leg 150. Alternatively, the third leg 130 is connected to the storage battery 35. In such a case, a predetermined energy is sent to the storage battery 35 to charge the storage battery 35. Further, the designated power transmission/reception leg and the distributed power supply (also including the storage battery) on which a self-commutated inverter is mounted may be connected. However, the designated power transmission/reception leg and the distributed power supply on which an externally commutated inverter is mounted cannot be connected.

The leg operated in the designated power transmission/reception mode is called a designated power transmission/reception leg. In one power router, a plurality of designated power transmission/reception legs may be provided.

The operation control of the designated power transmission/reception leg will be described. Since the control when the designated power transmission/reception leg is started is basically the same as that when the master leg is started, a description thereof will be omitted.

The operation control when the designated power transmission/reception leg is operated will be described.

(In the following description, symbols attached to the components of the fifth leg 150 will be used.)

A voltage sensor 154 measures the voltage of the electrical grid of the connection partner to obtain the phase and the frequency of the voltage of the connection partner using a phase-locked loop (PLL) or the like. The target value of the current that the power converter 151 receives or outputs is obtained based on an active power value and a reactive power value specified by the management server 50 and the phase and the frequency of the voltage of the connection partner. A current sensor 152 measures the current value of the current. The power converter 151 is adjusted so that the current corresponding to the difference between the target value and the current value is additionally output. (At least one of the phase and the amplitude of the voltage outputted from the power conversion unit 151 is adjusted so that a desired power flows between the designated power transmission/reception leg and the connection partner.)

From the above description, it will be understood that the first to fifth legs having the same configuration can play roles having three different patterns according to the method of the operation control.

(Connection Restrictions)

Since the operations of the legs vary according to the difference in the operation mode, there are respective restrictions regarding the selection of the connection partner and the selection of the operation mode. That is, when the connection partner is determined, the operation mode that can be selected is determined, and in contrast, when the operation mode is determined, the connection partner that can be selected is determined. (When the connection partner is changed, the operation mode of the leg needs to be changed according to the change of the connection partner.)

Patterns of possible combinations of connections will be described below.

In the following description, the expressions in the diagrams are simplified as shown in FIG. 3.

Specifically, the master leg is denoted by M.

The stand-alone leg is denoted by S.

The designated power transmission/reception leg is denoted by D.

The AC-through leg is denoted by AC.

Further, the legs may be differentiated from one another by numbers such as "#1" attached to the top of the legs as necessary.

While systematized symbols are attached for each of figures starting from FIG. 3, the same elements are not necessarily denoted by the same reference symbols throughout the drawings.

Figure 4A:
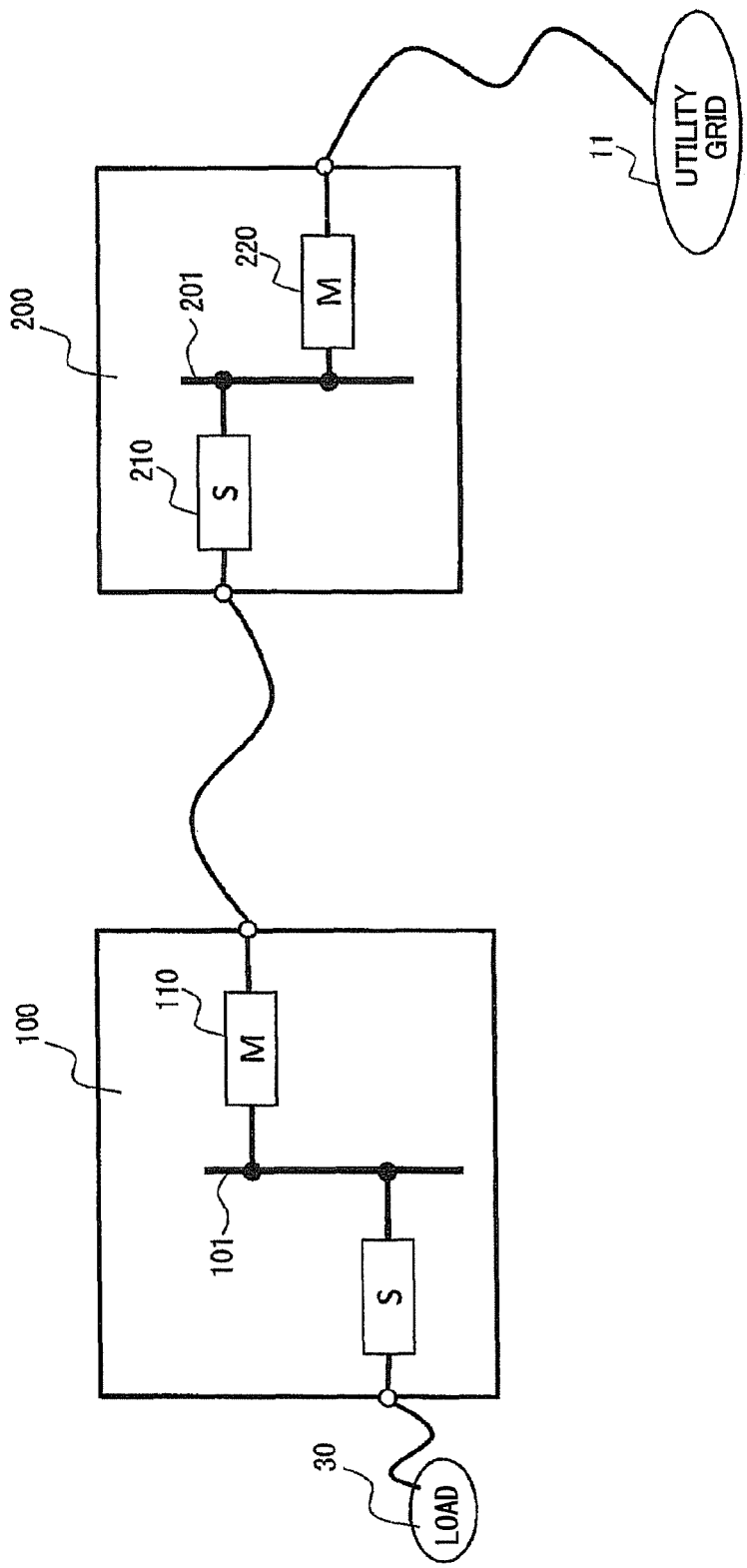
FIG. 4A is a diagram showing an example of a combination of power routers whose connection is permitted.

For example, the symbol 200 in FIG. 3 and the symbol 200 in FIG. 4A do not indicate the same component.

All the combinations of the connections shown in FIG. 3 are available. A first leg 210 is connected to the utility grid 11 as a master leg. This connection has already been described above. A second leg 220 is connected to the load 30 as the stand-alone leg. This connection has already been described above as well. A third leg 230 and a fourth leg 240 are connected to the storage battery 35 as the designated power transmission/reception legs. This connection has already been described above as well.

A fifth leg 250 is an AC-through leg. The AC-through leg 250 is connected to the designated power transmission/reception leg of another power router 300 and the AC-through leg 250 is connected to the storage battery 35 through a connection terminal 245 of the fourth leg 240. Since the AC-through leg 250 does not include a power conversion unit, this above connection relation is equivalent to the state in which the designated power transmission/reception leg of the other power router 300 is directly connected to the storage battery 35. It is understood that such a connection is permitted.

A sixth leg 260 is connected to the utility grid 11 as the designated power transmission/reception leg. If it is assumed that a predetermined power is received from the utility grid 11 through the sixth leg 260, it is understood that such a connection is permitted. Considering that the first leg 210 is the master leg, if the power received by the sixth leg 260 is insufficient to keep the voltage of the DC bus 201 to the rated voltage, the master leg 210 receives necessary power from the utility grid 11. In contrast, when the power received by the sixth leg 260 exceeds the amount that is necessary to keep the voltage of the DC bus 201 to the rated voltage, the master leg 210 transfers excessive power to the utility grid 11.

Next, a case in which the power routers are connected to each other will be described. Connecting the power routers means connecting a leg of one power router and a leg of another power router. When the legs are connected to each other, the operation modes that can be combined are restricted.

Figure 4B:
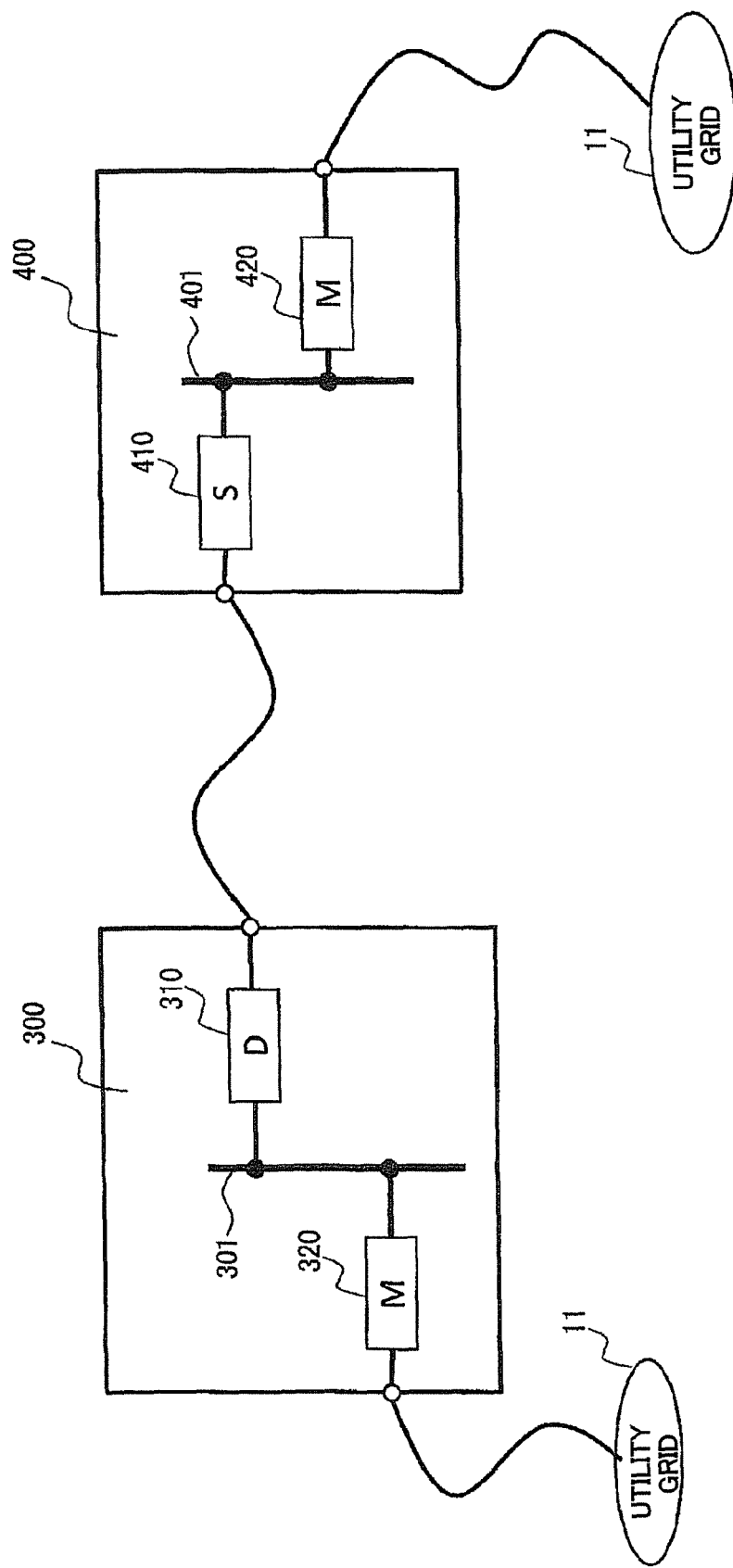
FIG. 4B is a diagram showing an example of a combination of power routers whose connection is permitted.

Both of the combinations of the connections shown in FIGS. 4A and 4B are available. In FIG. 4A, the master leg 110 of the first power router 100 and the stand-alone leg 210 of the second power router 200 are connected. While the details of this connection will not be described, the master leg 220 of the second power router 200 is connected to the utility grid 11, whereby the voltage of the DC bus 201 of the second power router 200 is kept to be the rated voltage.

In FIG. 4A, when power is supplied to the load 30 from the first power router 100, the voltage of the DC bus 101 decreases. The master leg 110 obtains power from the connection partner so as to keep the voltage of the DC bus 101. That is, the master leg 110 draws insufficient power from the stand-alone leg 210 of the second power router 200. The stand-alone leg 210 of the second power router 200 sends power required from the connection partner (in this example, the master leg 110). While the voltage decreases by the energy sent from the stand-alone leg 210 in the DC bus 201 of the second power router 200, this is supplemented from the utility grid 11 by the master leg 220. In this way, the first power router 100 can obtain a necessary energy from the second power router 200.

As described above, even when the master leg 110 of the first power router 100 and the stand-alone leg 210 of the second power router 200 are connected, each of the master leg 110 and the stand-alone leg 210 can each play a role. Therefore, no disadvantage occurs in each of the operations in the master leg 110 and the stand-alone leg 210. Accordingly, the master leg and the stand-alone leg may be connected as shown in FIG. 4A.

In FIG. 4B, a designated power transmission/reception leg 310 of the third power router 300 and a stand-alone leg 410 of the fourth power router 400 are connected. While not described in detail, a master leg 320 of the third power router 300 and a master leg 420 of the fourth power router 400 are each connected to the utility grid 11. DC buses 301 and 401 of the third power router 300 and the fourth power router 400 thus keep the rated voltage.

It is assumed that the designated power transmission/reception leg 310 of the third power router 300 is instructed to receive a designated power according to the instruction from the management server 50. The designated power transmission/reception leg 310 draws the designated power from the stand-alone leg 410 of the fourth power router 400. The stand-alone leg 410 of the fourth power router 400 sends power required from the connection partner (in this example, the designated power transmission/reception leg 310). While the voltage of the DC bus 401 of the fourth power router 400 decreases by the energy sent from the stand-alone leg 410, this is supplemented from the utility grid 11 by the master leg 420.

As described above, even when the designated power transmission/reception leg 310 of the third power router 300 and the stand-alone leg 410 of the fourth power router 400 are connected, the designated power transmission/reception leg 310 and the stand-alone leg 410 can each play a role. Therefore, no disadvantage occurs in each of the operations in the designated power transmission/reception leg 310 and the stand-alone leg 410. Accordingly, the designated power transmission/reception leg and the stand-alone leg may be connected as shown in FIG. 4B.

While the case in which the third power router 300 obtains power from the fourth power router 400 has been described above, it should be understood that there is also no disadvantage in a case in which the third power router 300 gives power to the fourth power router 400.

It is therefore possible to interchange the designated power between the third power router 300 and the fourth power router 400.

When the legs having the power conversion units are directly connected to each other, only two connection patterns shown in FIGS. 4A and 4B are permitted. Specifically, only the case in which the master leg and the stand-alone leg are connected and the case in which the designated power transmission/reception leg and the stand-alone leg are connected are permitted.

Next, combinations of the legs that cannot be connected will be described.

FIGS. 5A to 5D are patterns in which legs should not be connected.

Figure 5A:
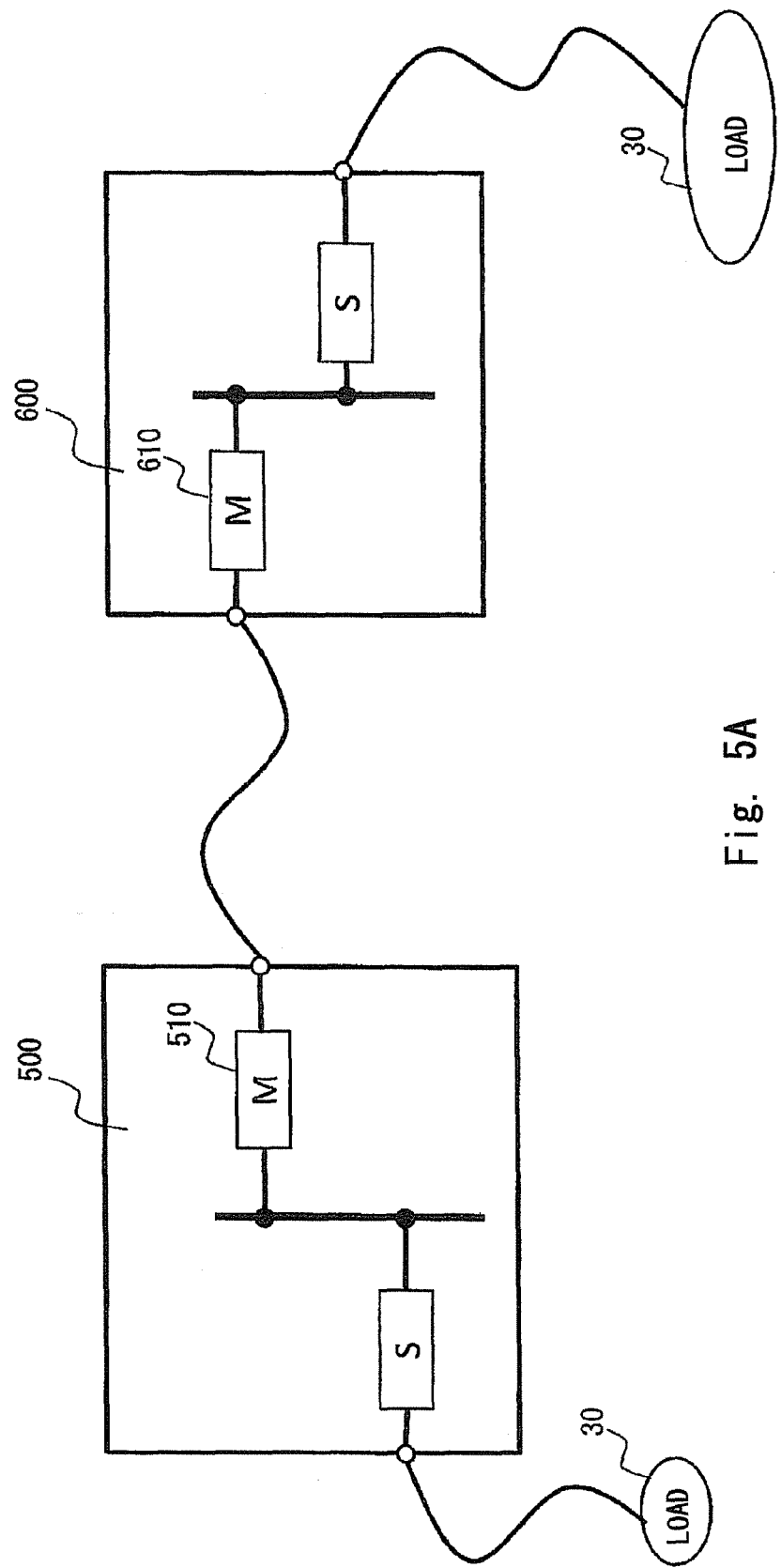
FIG. 5A is a diagram showing an example of a combination of power routers whose connection is prohibited.
Figure 5B:
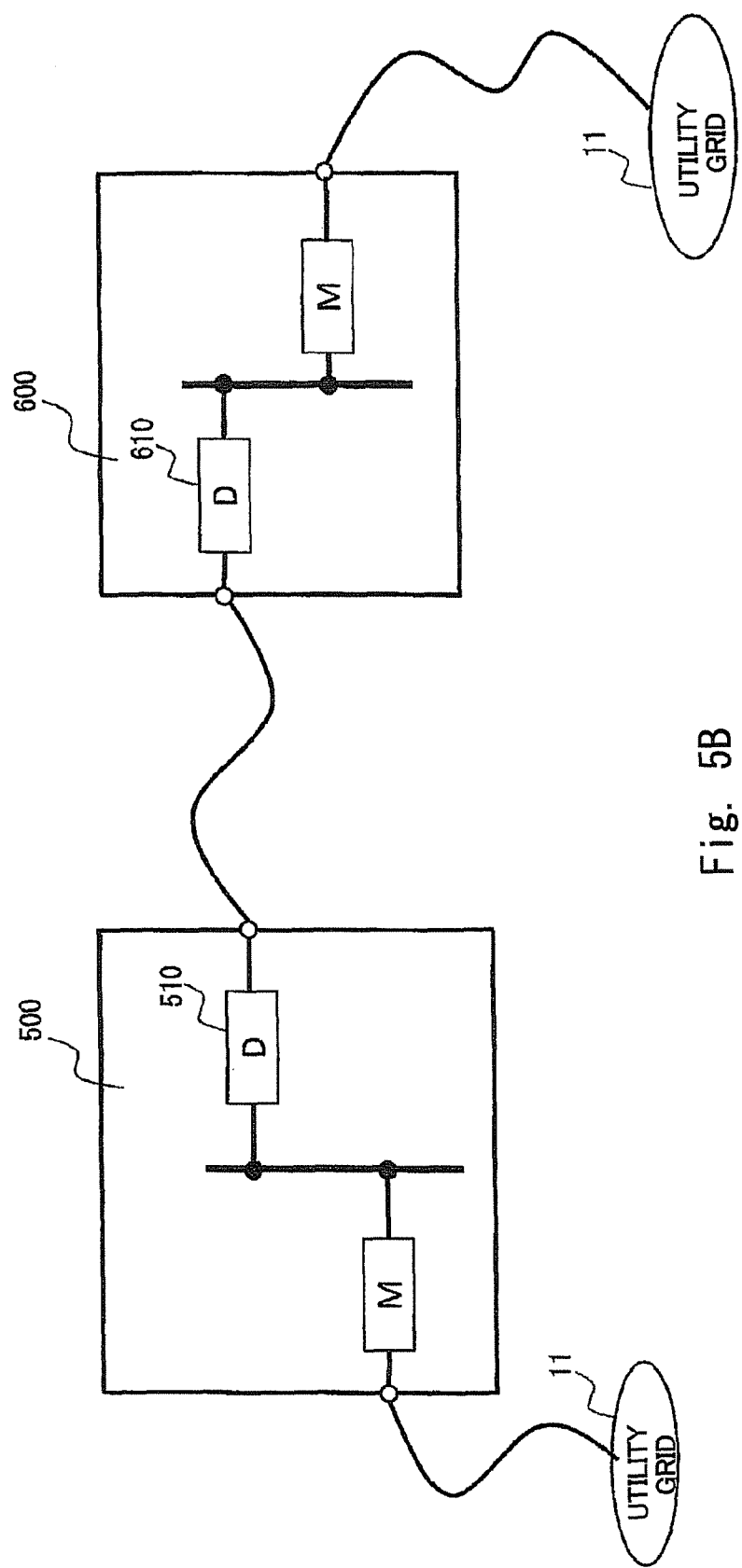
FIG. 5B is a diagram showing an example of a combination of power routers whose connection is prohibited.
Figure 5C:
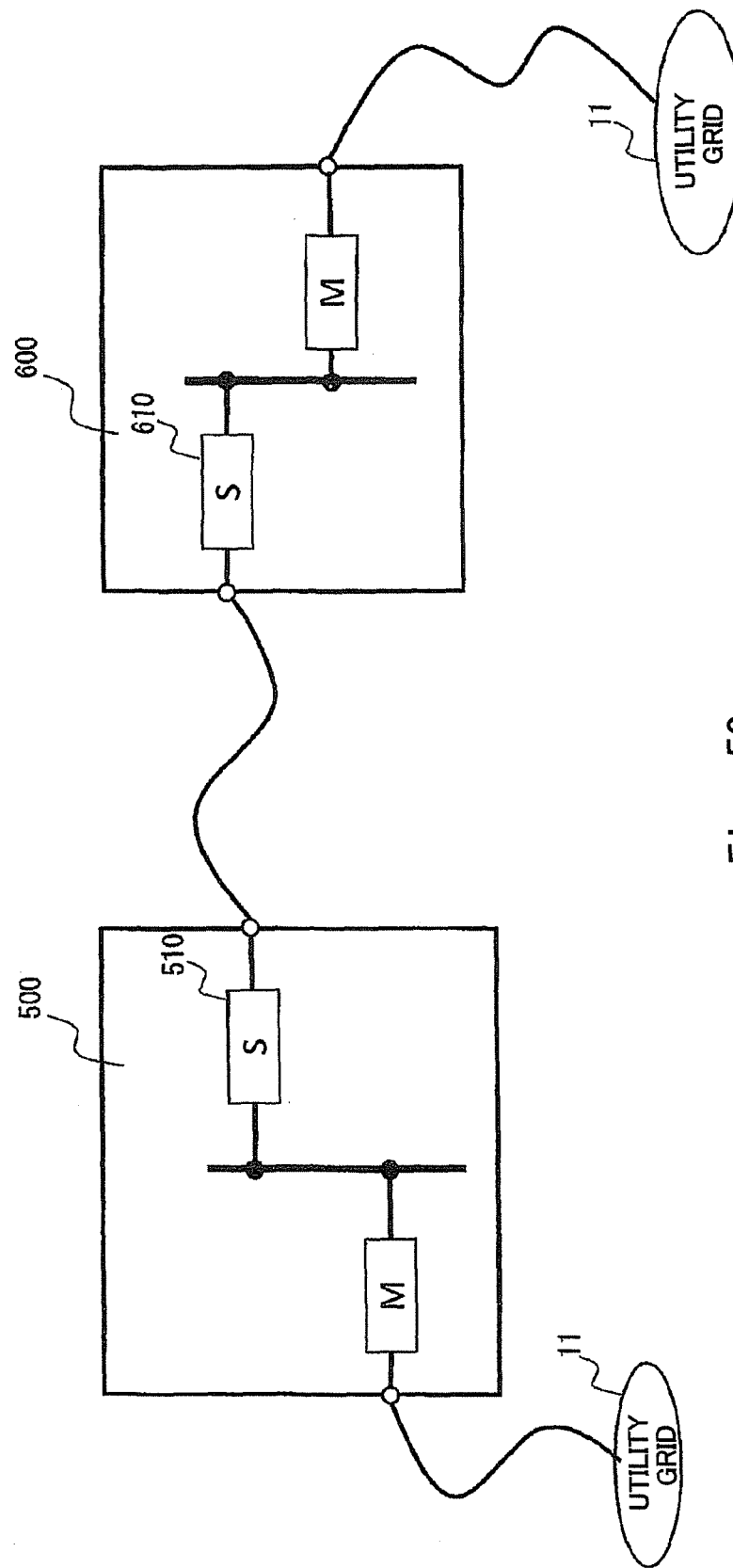
FIG. 5C is a diagram showing an example of a combination of power routers whose connection is prohibited.

As shown in FIGS. 5A, 5B, and 5C, the legs that are in the same operation mode must not be connected.

In the case of FIG. 5A, for example, the master legs are connected.

The master leg first performs processing for generating power in synchronization with the phase, the frequency, and the voltage of the connection partner, as described above in the description of the operation.

When the connection partner is also a master leg, each master leg tries to be synchronized with the voltage and the frequency of the other master leg. However, since the master leg does not establish the voltage and the frequency in a stand-alone manner, the synchronous processing stated above does not succeed.

Therefore, the master legs cannot be connected to each other.

There are other reasons why the master legs cannot be connected to each other as follows.

The master leg needs to draw power from the connection partner in order to keep the voltage of the DC bus. (Otherwise excessive power needs to be made to flow out to the connection partner in order to keep the voltage of the DC bus.) When the master legs are connected to each other, each master leg cannot meet the requirements of the connection partner. (If the master legs are connected to each other, neither of the power routers can keep the voltage of the DC bus. This may cause a malfunction such as blackout in each power cell.) In this way, if the master legs are connected to each other, the roles of the master legs conflict with each other (do not match). The master legs therefore must not be connected to each other.

While the designated power transmission/reception legs are connected to each other in FIG. 5B, it should be understood that this connection is not available as well.

As described above in the description of the operation, similar to the master leg, the designated power transmission/reception leg first performs processing for generating power in synchronization with the phase, the frequency, and the voltage of the connection partner.

When the connection partner is also a designated power transmission/reception leg, each leg tries to be synchronized with the voltage and the frequency of the other leg. However, since the designated power transmission/reception leg does not establish the voltage and frequency in a stand-alone manner, the synchronous processing stated above does not succeed.

Therefore, the designated power transmission/reception legs cannot be connected to each other.

There are other reasons why the above legs cannot be connected to each other as follows.

Even if the designated transmitted power that should be sent by one designated power transmission/reception leg 510 is made equal to the designated received power that should be received by the other designated power transmission/reception leg 610, such designated power transmission/reception legs should not be connected to each other. Assume a case, for example, in which one designated power transmission/reception leg 510 adjusts the power conversion unit to send the designated transmitted power. (For example, the output voltage is made higher than that of the connection partner by a predetermined value.) On the other hand, the other designated power transmission/reception leg 610 adjusts the power conversion unit to receive the designated received power. (For example, the output voltage is made lower than that of the connection partner by a predetermined value.) It will be understood that, when such an adjustment operation is executed in both of the designated power transmission/reception legs 510 and 610 at the same time, both of the designated power transmission/reception legs 510 and 610 become uncontrollable.

While the stand-alone legs are connected in FIG. 5C, it should be understood that such a connection is prohibited.

The stand-alone leg generates a voltage and a frequency by itself.

If one of the voltage, the frequency, and the phase generated by the two stand-alone legs is deviated from the other by even a slight amount in a state in which the stand-alone legs are connected, unintended power flows between the two stand-alone legs.

It is impossible to completely keep the voltage, the frequency, and the phase generated by the two stand-alone legs to be equal. Therefore, the stand-alone legs should not be connected.

Figure 5D:
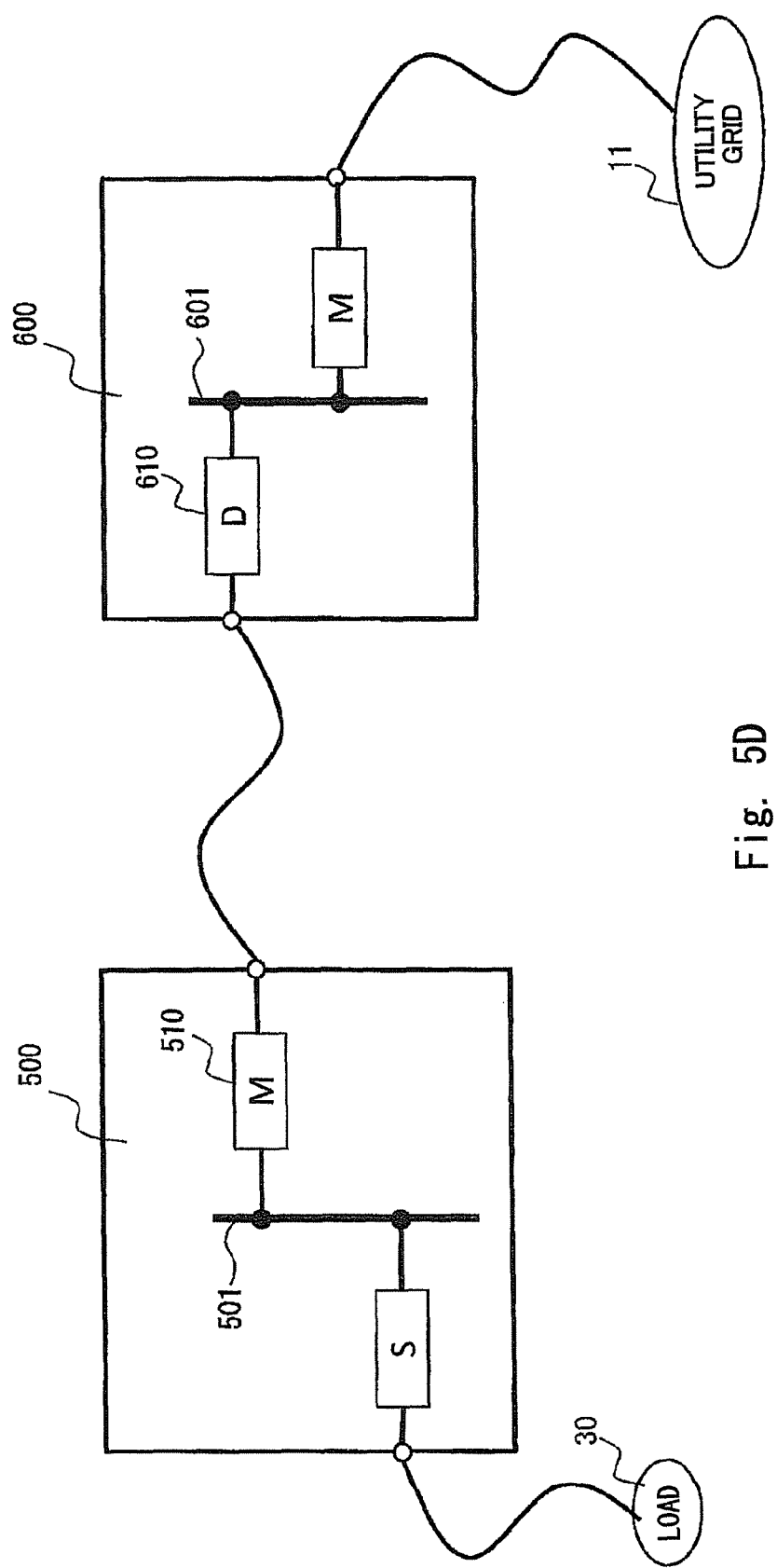
FIG. 5D is a diagram showing an example of a combination of power routers whose connection is prohibited.

In FIG. 5D, the master leg and the designated power transmission/reception leg are connected.

It should be understood from the above description that this connection is not available as well. Even when the master leg 510 transmits power to or receives power from the connection partner to keep the voltage of the DC bus 501, the designated power transmission/reception leg 610 does not transmit or receive power according to the request from the master leg 510. Accordingly, the master leg 510 cannot keep the voltage of the DC bus 501. Further, even when the designated power transmission/reception leg 610 transmits designated power to or receives it from the connection partner (510), the master leg 510 does not transmit or receive power according to the request from the designated power transmission/reception leg 610. Accordingly, the designated power transmission/reception leg 610 cannot transmit the designated power to or receive it from the connection partner (in this example, the master leg 510).

Figure 6A:
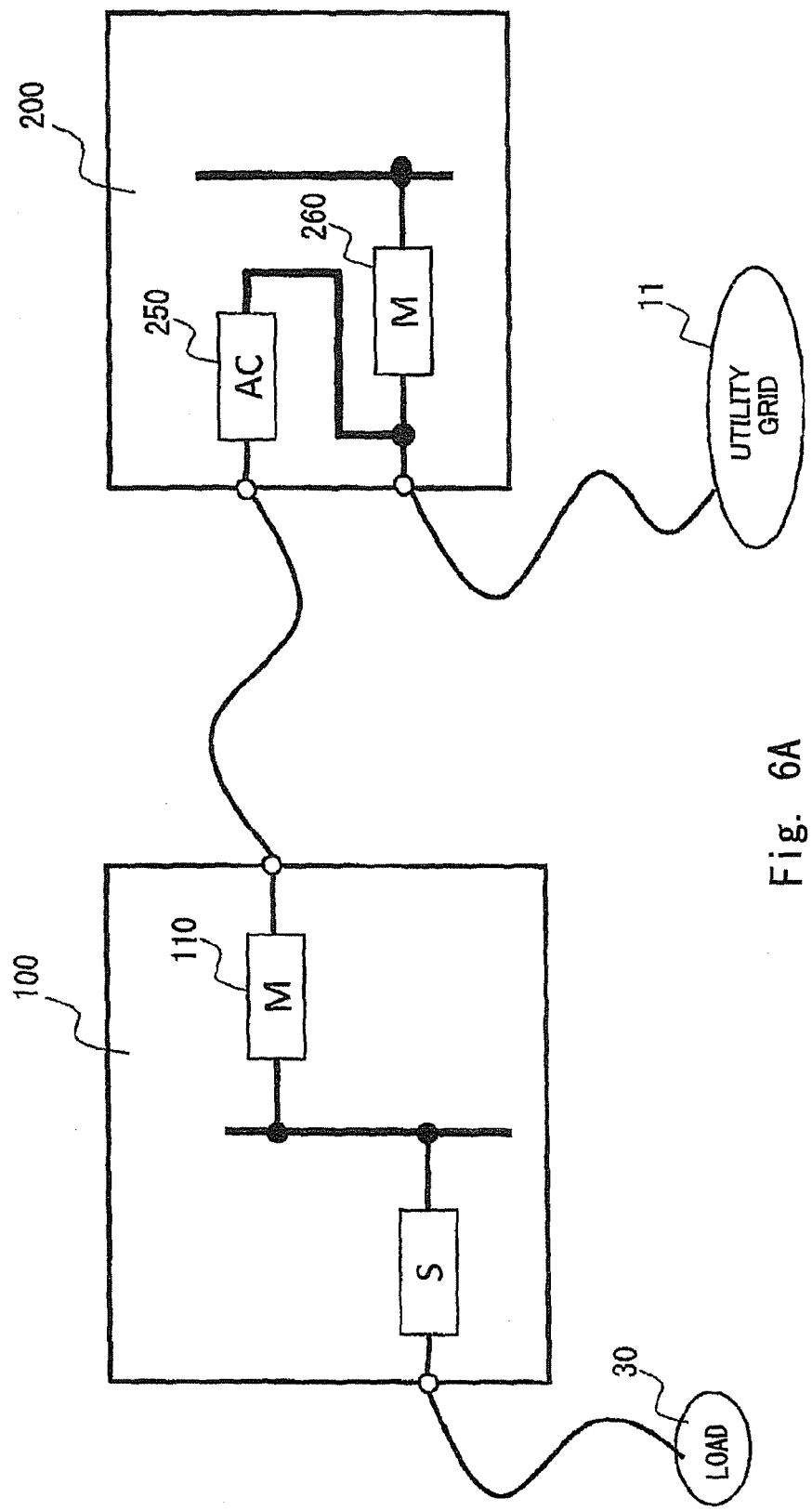
FIG. 6A is a diagram showing an example of a combination of power routers whose connection is permitted when an AC-through leg is taken into consideration.
Figure 6B:
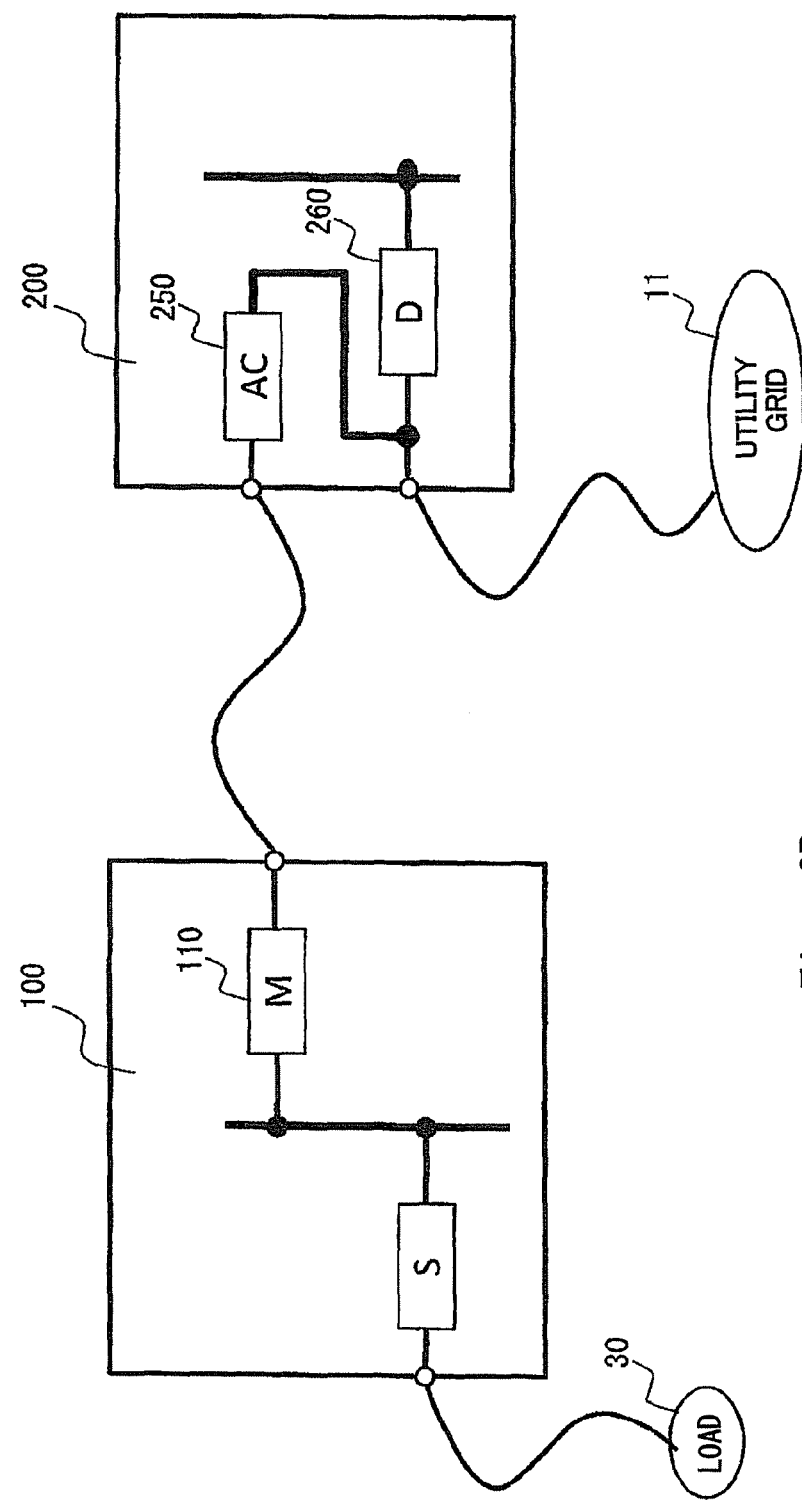
FIG. 6B is a diagram showing an example of a combination of power routers whose connection is permitted when the AC-through leg is taken into consideration.
Figure 6C:
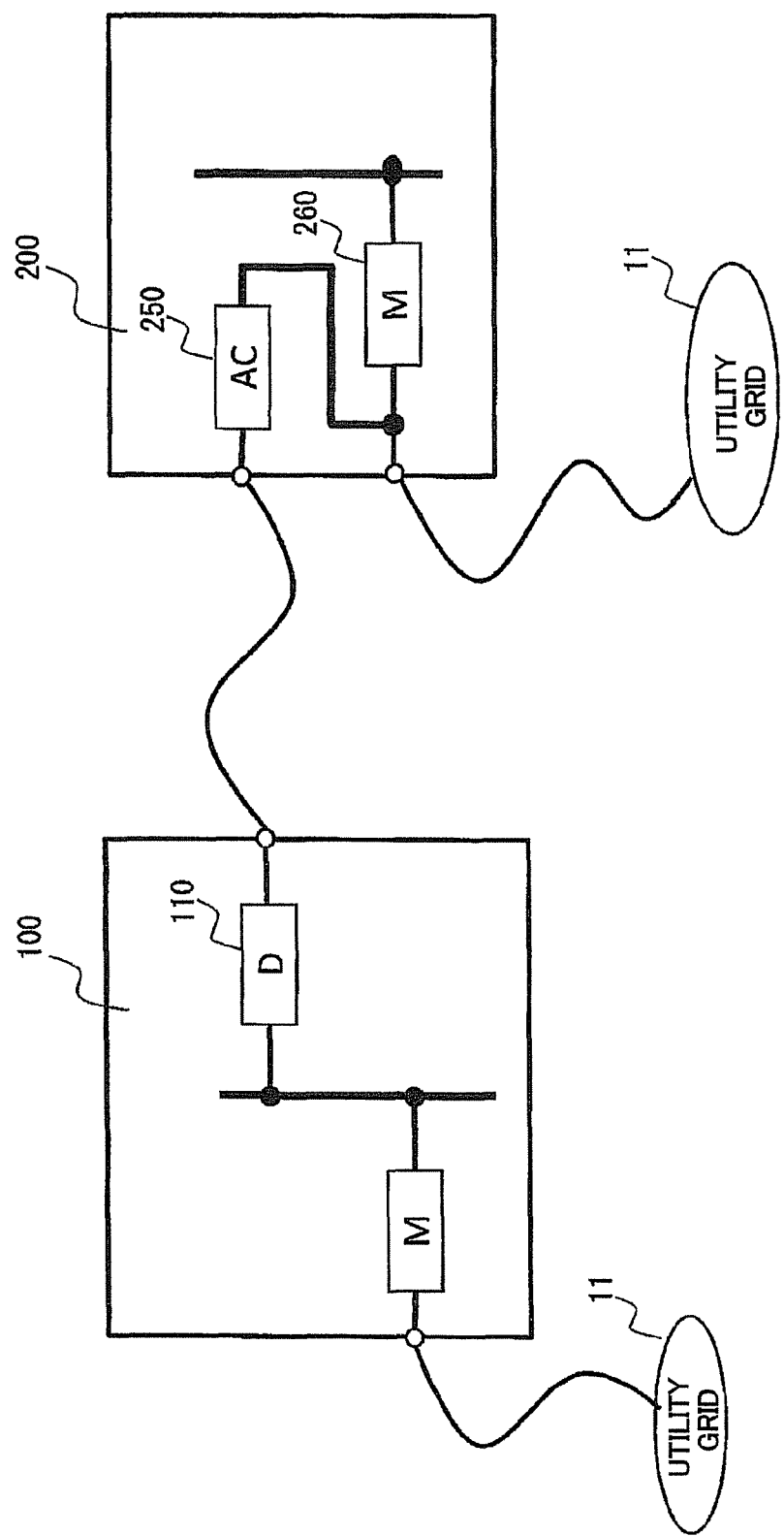
FIG. 6C is a diagram showing an example of a combination of power routers whose connection is permitted when the AC-through leg is taken into consideration.
Figure 6D:
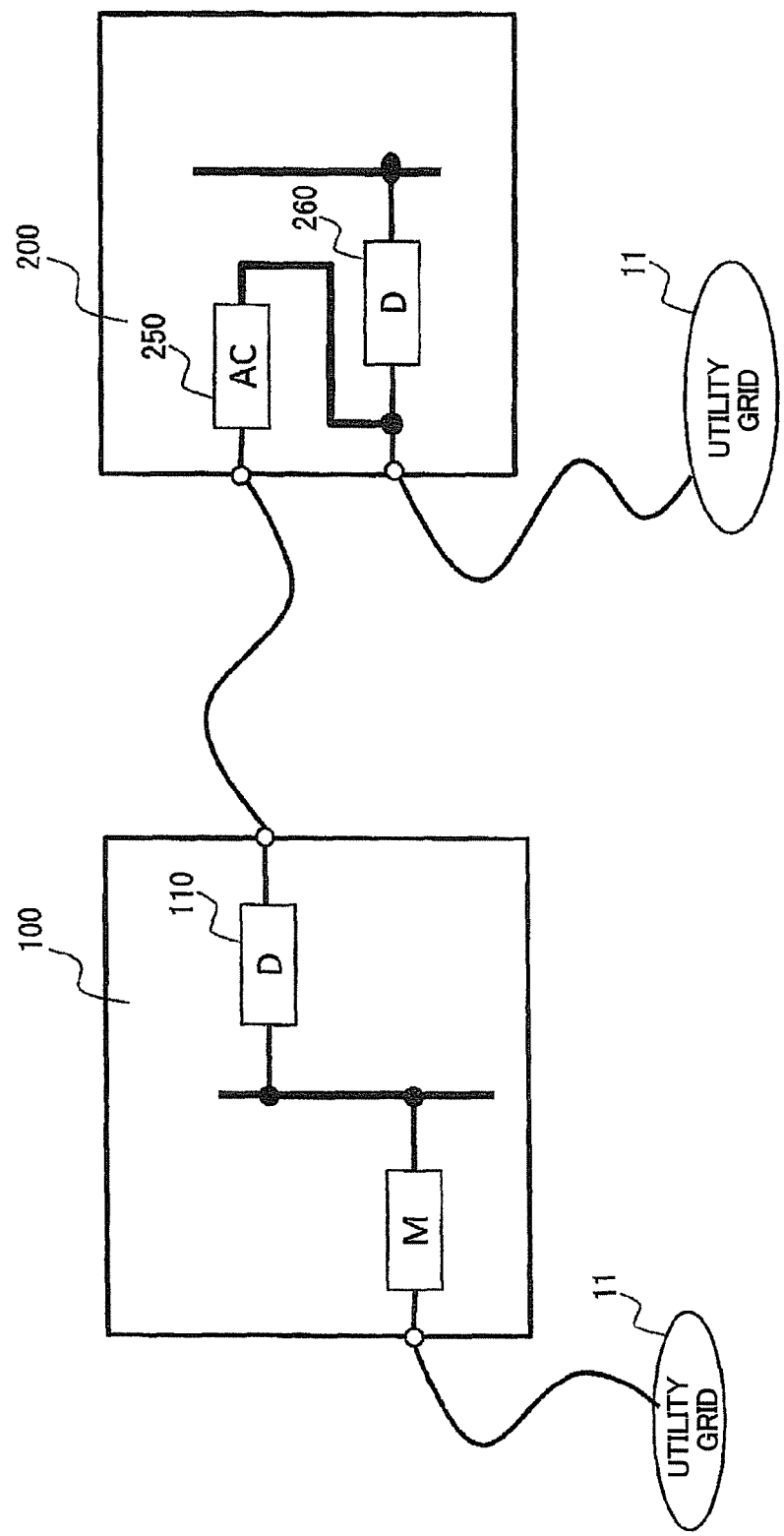
FIG. 6D is a diagram showing an example of a combination of power routers whose connection is permitted when the AC-through leg is taken into consideration.

The case in which the legs including power conversion units are connected has been stated above. When an AC-through leg is taken into consideration, patterns shown in FIGS. 6A to 6D are also available. Since the AC-through leg does not include a power conversion unit, it is a simple bypass. Accordingly, as shown in FIGS. 6A and 6B, the situation in which the master leg 110 of the first power router 100 is connected to the utility grid 11 through the AC-through leg 250 of the second power router 200 is substantially equal to the situation in which the master leg 110 is directly connected to the utility grid 11. In a similar way, as shown in FIGS. 6C and 6D, the situation in which the designated power transmission/reception leg 110 of the first power router 100 is connected to the utility grid 11 through the AC-through leg 250 of the second power router 200 is substantially equal to the situation in which the designated power transmission/reception leg 110 is directly connected to the utility grid 11.

Figure 7:
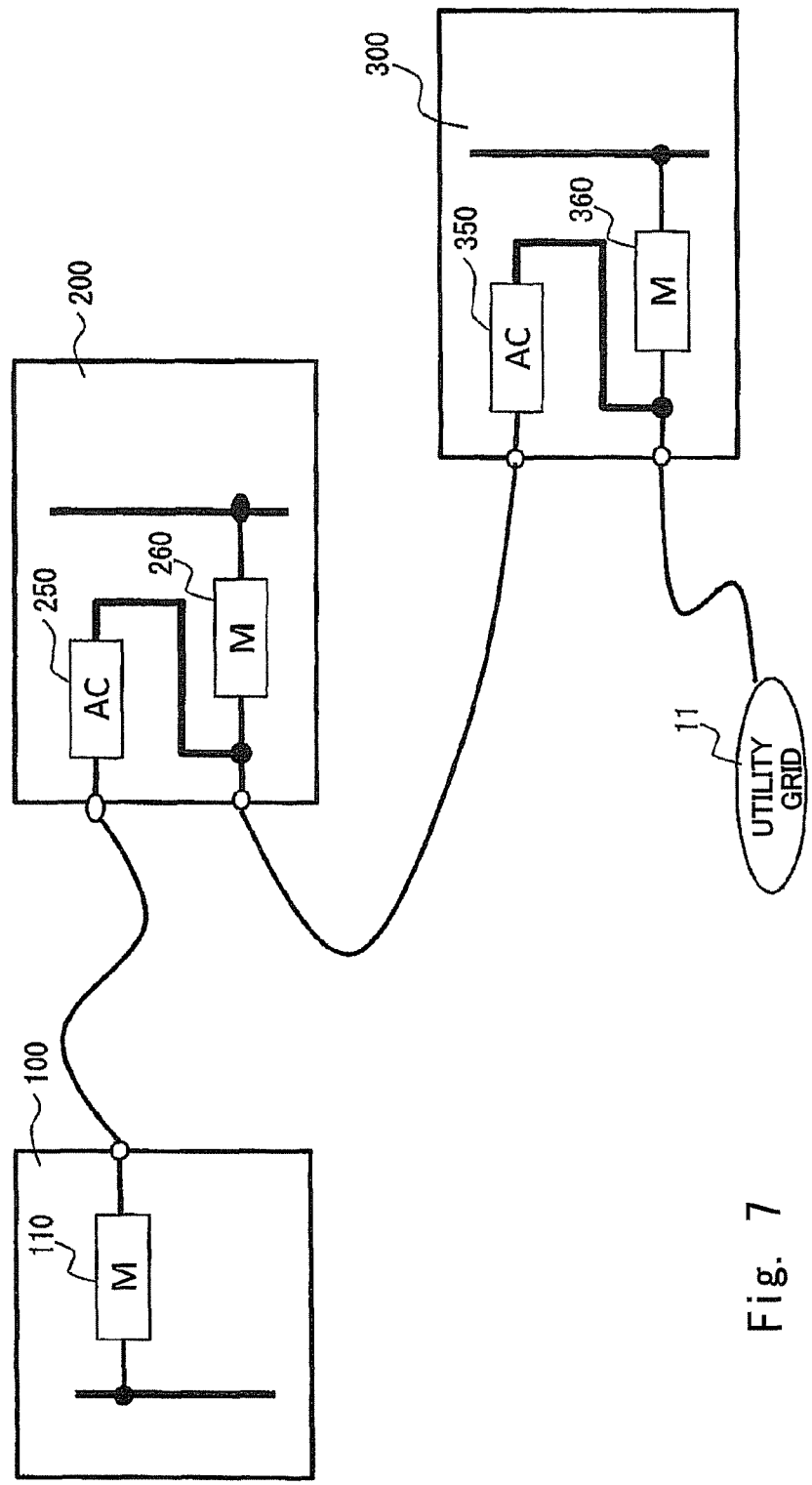
FIG. 7 is a diagram showing a connection example in which AC-through legs are used.

Still, it is convenient to provide the AC-through leg. There may be a case, for example, in which the distance from the first power router 100 to the utility grid 11 is extremely long and some power routers 200 and 300 need to be passed to connect the first power router 100 to the utility grid 11, as shown in FIG. 7. If it is assumed that the AC-through leg is not provided, as shown in FIG. 4A, one or a plurality of stand-alone legs need to be passed. When a leg including a power conversion unit is passed, it requires conversion from AC power into DC power and conversion from DC power into AC power. The power conversion causes an energy loss, though the loss is low (several %). It is inefficient to require a power conversion a plurality of times only to connect the power router to the utility grid. It is therefore preferable that the AC-through leg which does not include a power conversion unit is provided in the power router.

Figure 9:
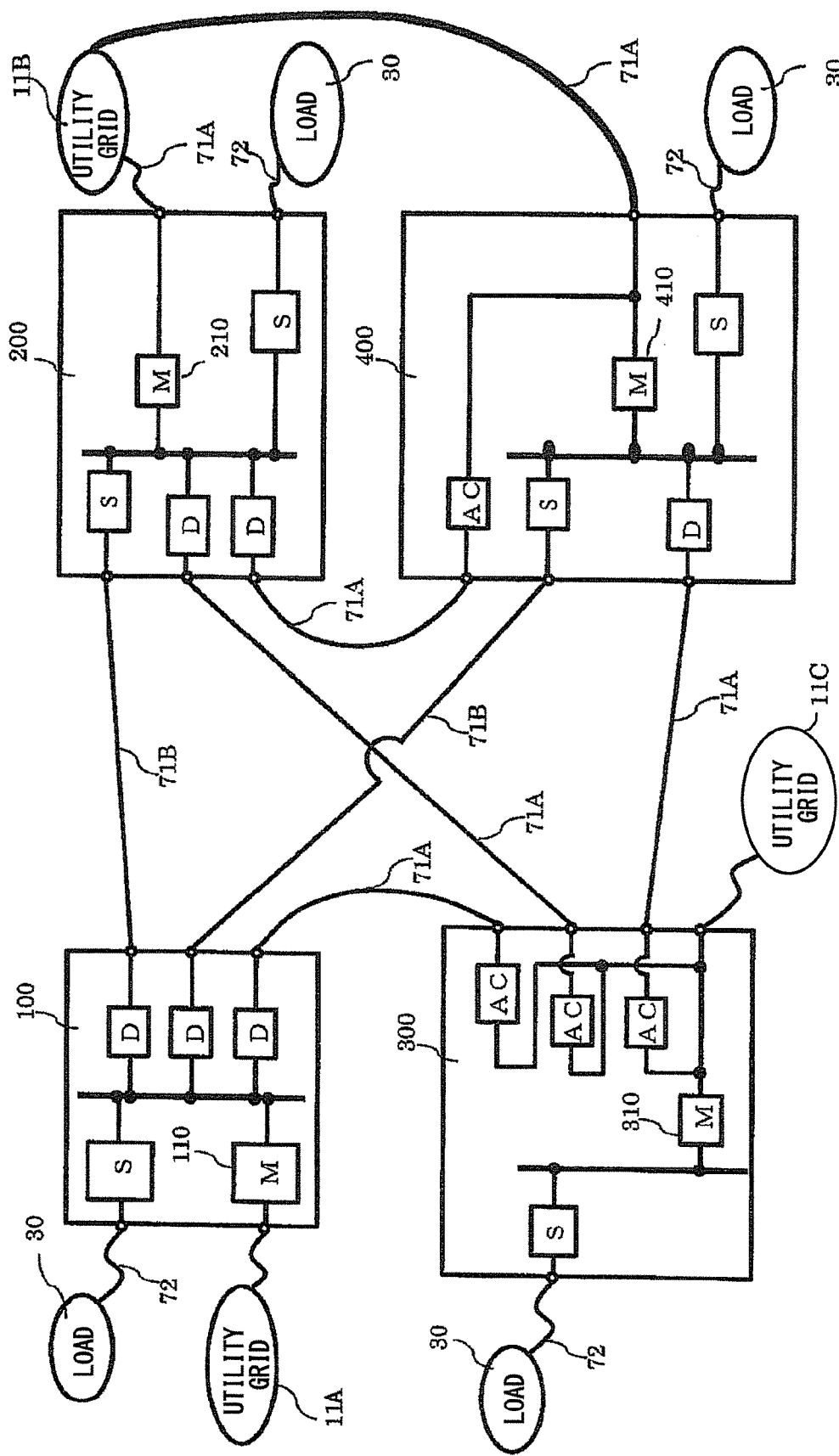
FIG. 9 is a diagram of one example of a case in which four power routers are interconnected.

FIG. 8 shows the combination of connections described above. FIG. 9 shows one example in which the four power routers 100-400 are interconnected. Since all of the connection relations have been described above, each connection partner will not be described in detail. It would be understood, however, that all of the connection relations are permitted.

Now, the connection line which connects the power router and the connection partner will be additionally described.

When the connection line that connects power routers is called a power-transmission line, the power-transmission line may be a part of the utility grid or may be separated from the utility grid.

(In FIG. 9, the power-transmission line which is a part of the utility grid is denoted by the symbol 71A and the power-transmission line separated from the utility grid is denoted by the symbol 71B.) In summary, a plurality of power routers may be connected to the utility grid. In this way, by connecting two or more power routers through the utility grid, power interchange can be performed among the plurality of power routers through the utility grid, and the utility grid can adjust the excessive power or the insufficient power to be interchanged. Alternatively, two or more power routers may be connected to each other without the intervention of the utility grid. Further, when the connection line that connects the power router and the load (or the distributed power supply) is called a distribution line 72, the distribution line 72 is separated from the utility grid 11. In summary, the distribution line 72 that connects the power router and the load (or distributed power supply) is not connected to the utility grid 11.

Figure 10:
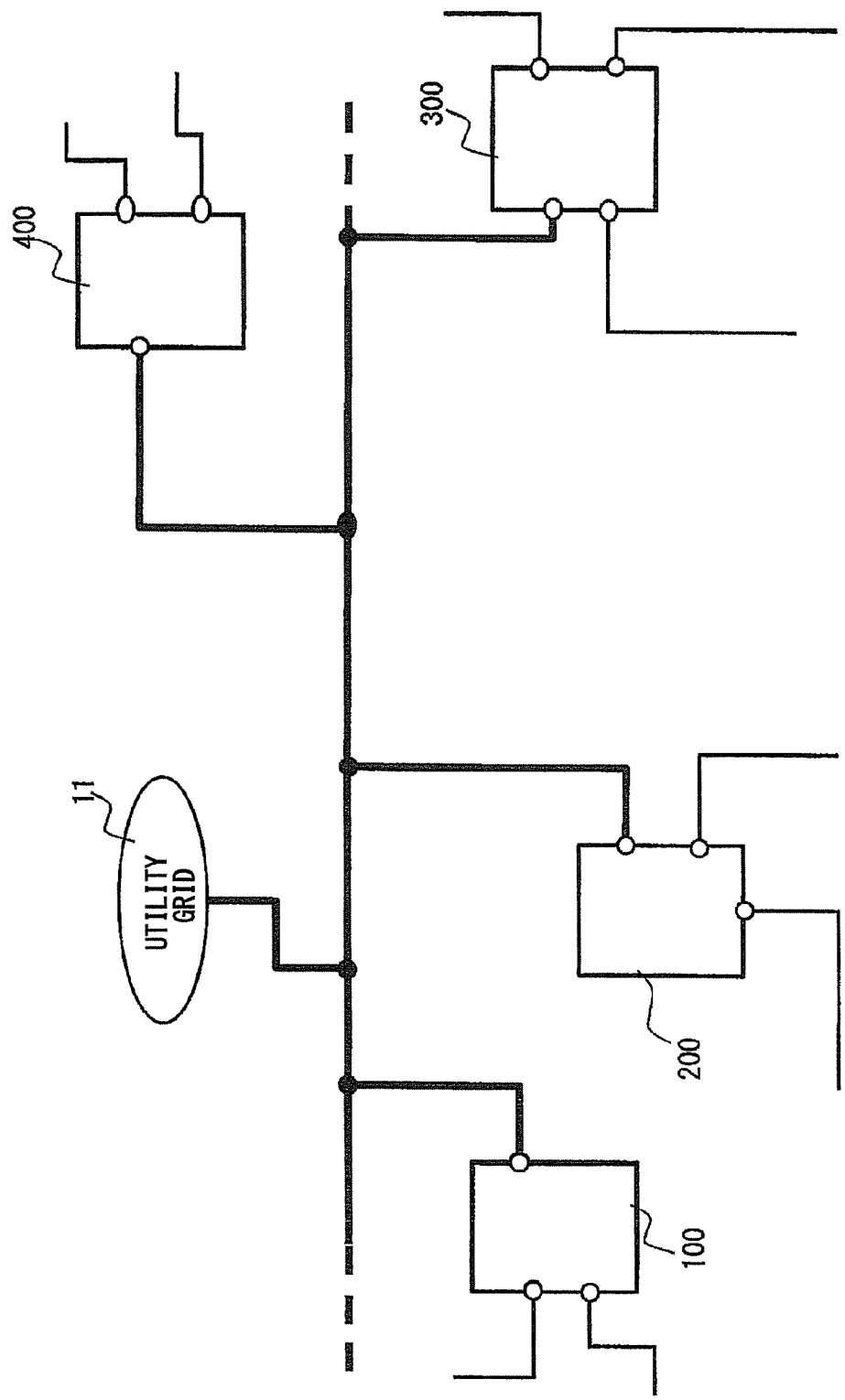
FIG. 10 is a diagram showing one example of a state in which a plurality of power routers are connected by a bus.

Further, as shown in FIG. 10, the power routers 100-400 may be connected like a bus connection. While a description of the operation mode of each leg is omitted, it is needless to say that the operation mode of each leg needs to be appropriately selected in consideration of the direction of power interchange and the connection restrictions described above.

As a matter of course, the utility grid 11 may be replaced by a distributed power supply such as a power generation facility or a storage battery in FIG. 10. That is, the plurality of power routers may be connected to the distributed power supply by a bus.

Figure 11:
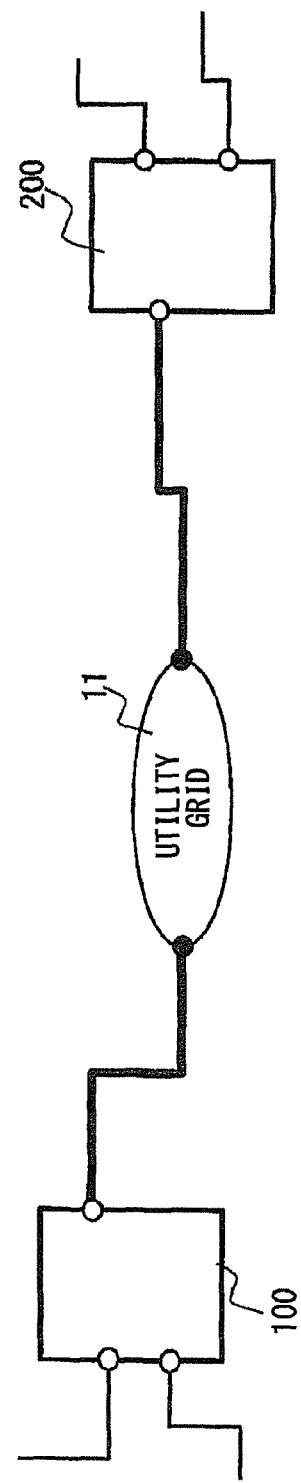
FIG. 11 is a diagram showing one example of a connection form in which a utility grid is provided between power routers.

Further, the example shown in FIG. 11 is an example of the connection form in which the two power routers 100 and 200 are connected to the utility grid 11. In FIG. 11, the utility grid 11 may be replaced by a distributed power supply.

As described above, the connection partner of the power router may be a utility grid, a distributed power supply including a storage battery or a power generation facility, or another power router. In this specification and claims, the above are collectively called a power system.

With the power router, it is possible to build a power network system in which the power cells are asynchronously interconnected. According to the connection restrictions described in this exemplary embodiment, legs can be connected to each other so that the roles of the legs do not conflict with each other. It is therefore possible to extend the power network system and to operate the whole system in a stable manner.

(Object of the Present Invention)

The object that is achieved by the present invention will be described in series.

EXAMPLE 1

Example 1 will be described with reference to FIGS. 12 to 16.

Figure 12:
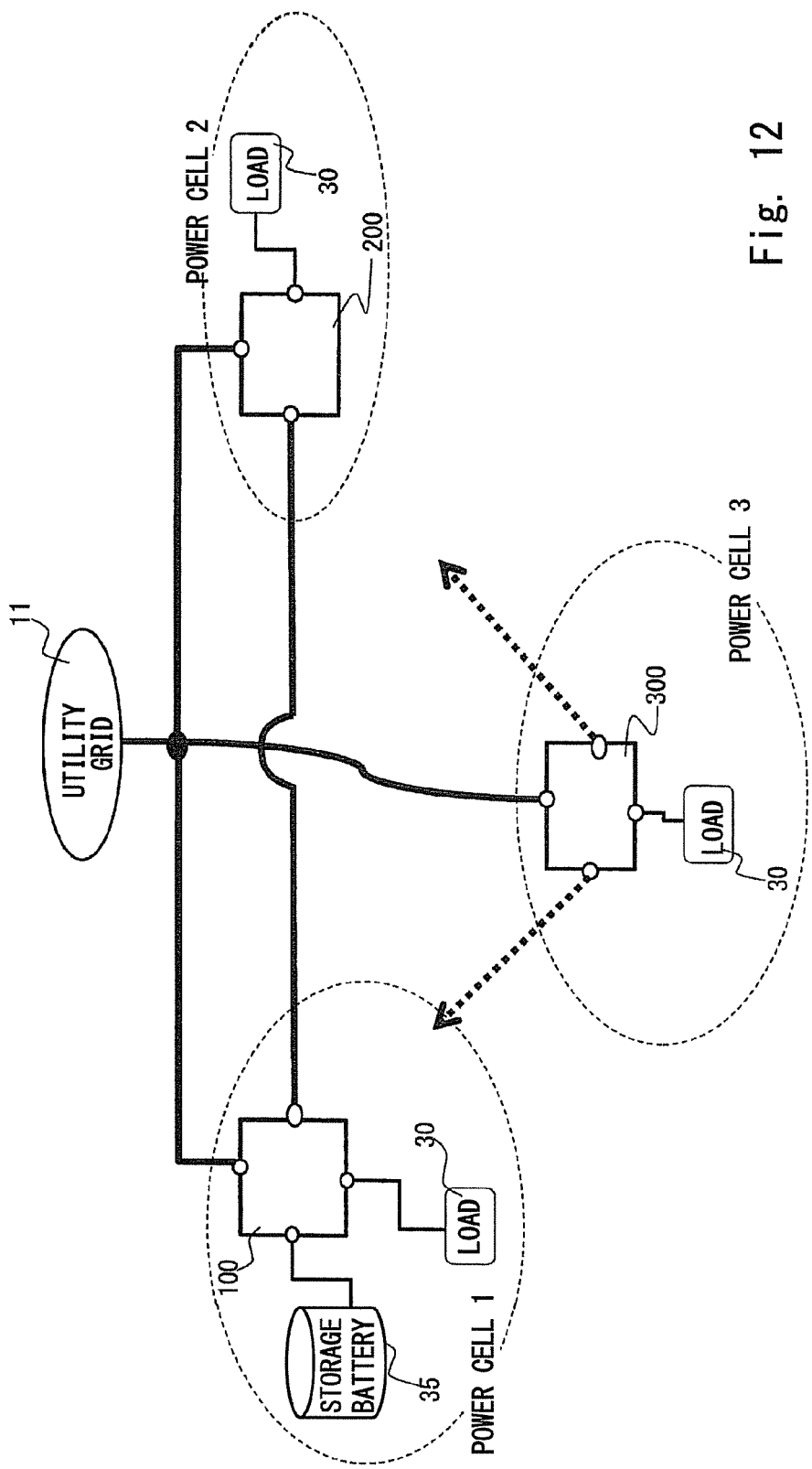
FIG. 12 is a diagram for explaining a first problem in detail as Example 1.

First, FIG. 12 will be referred.

In FIG. 12, a first power cell 1 and a second power cell 2 have already provided as existing power cells.

In the first power cell 1, the load 30 and the battery 35 are connected to the first power router 100.

The first power router 100 draws the power from the utility grid 11, and supplies the power to the load 30 or the storage battery 35.

On the other hand, in the second power cell 2, the second power router 200 is connected to the load 30.

The second power router 200 draws the power from the utility grid 11, and supplies the power to the load 30.

Here, as the preparedness for the case where the utility grid 11 is down, it is assumed that the first power router 100 and the second power router 200 are connected to each other, and the power can be transferred from one power router (the first power router 100) to the other power router (the second power router 200).

Here, a case in which a third power cell 3 is newly provided will be described.

In the third power cell 3, the load 30 is connected to the third power router 300.

It is assumed that the third power cell 3 does not have storage batteries.

First, the third power router 300 is connected to the utility grid 11. Then, as the preparedness for the case where the utility grid 11 breaks down, it will become a problem whether to connect the third power router 300 to the first power router 100 or the second power router 200.

It is assumed that there is an advantage that the distance from the third power router 300 to the second power router 200 is closer, and the third power router 300 is connected to the second power router 200 with giving paramount weight to this advantage.

Figure 13:
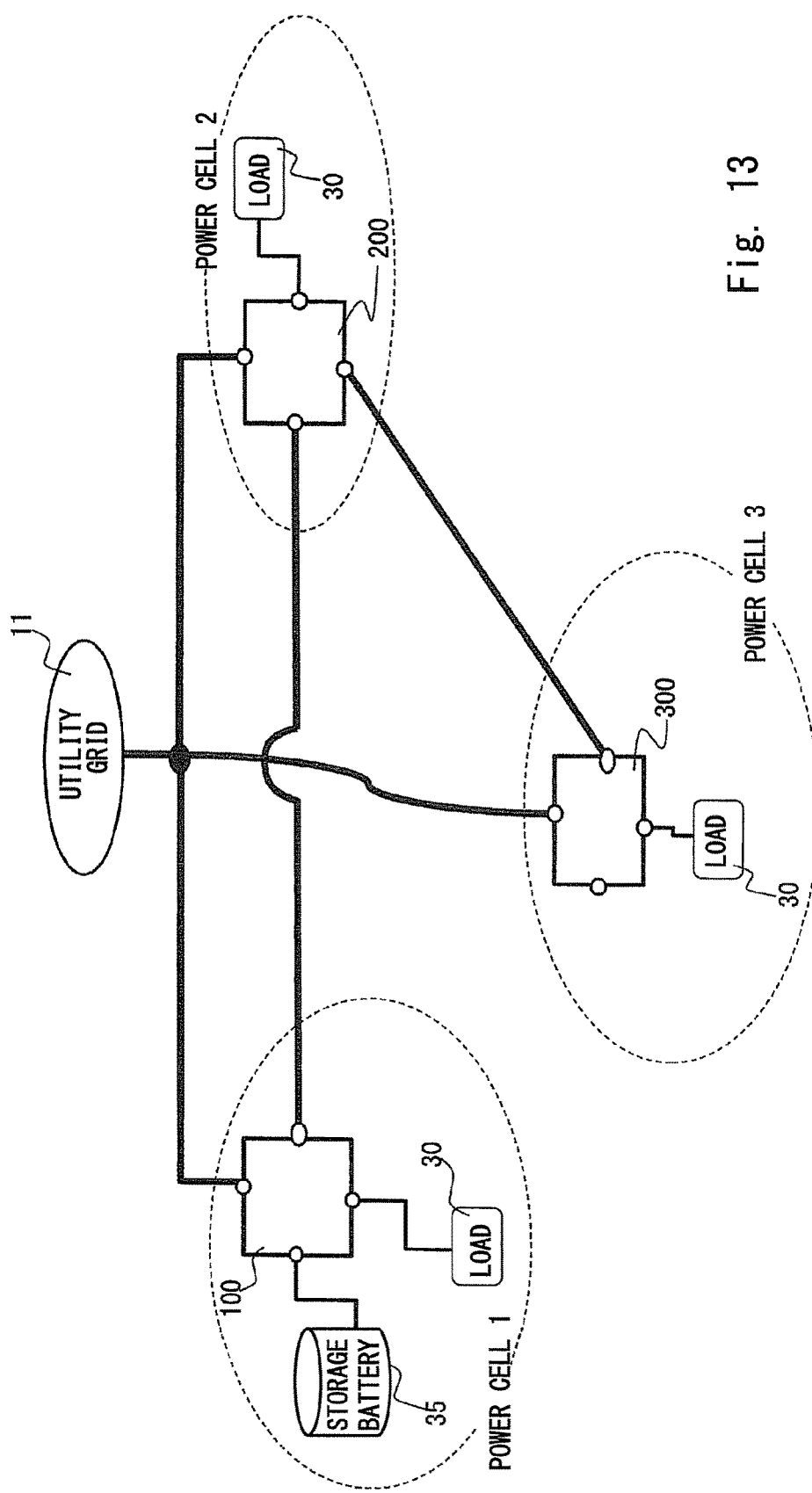
FIG. 13 is a diagram for explaining the first problem in detail as Example 1.

This above state is shown in FIG. 13.

Here, it will be assumed that the utility grid 11 breaks down.

Figure 14:
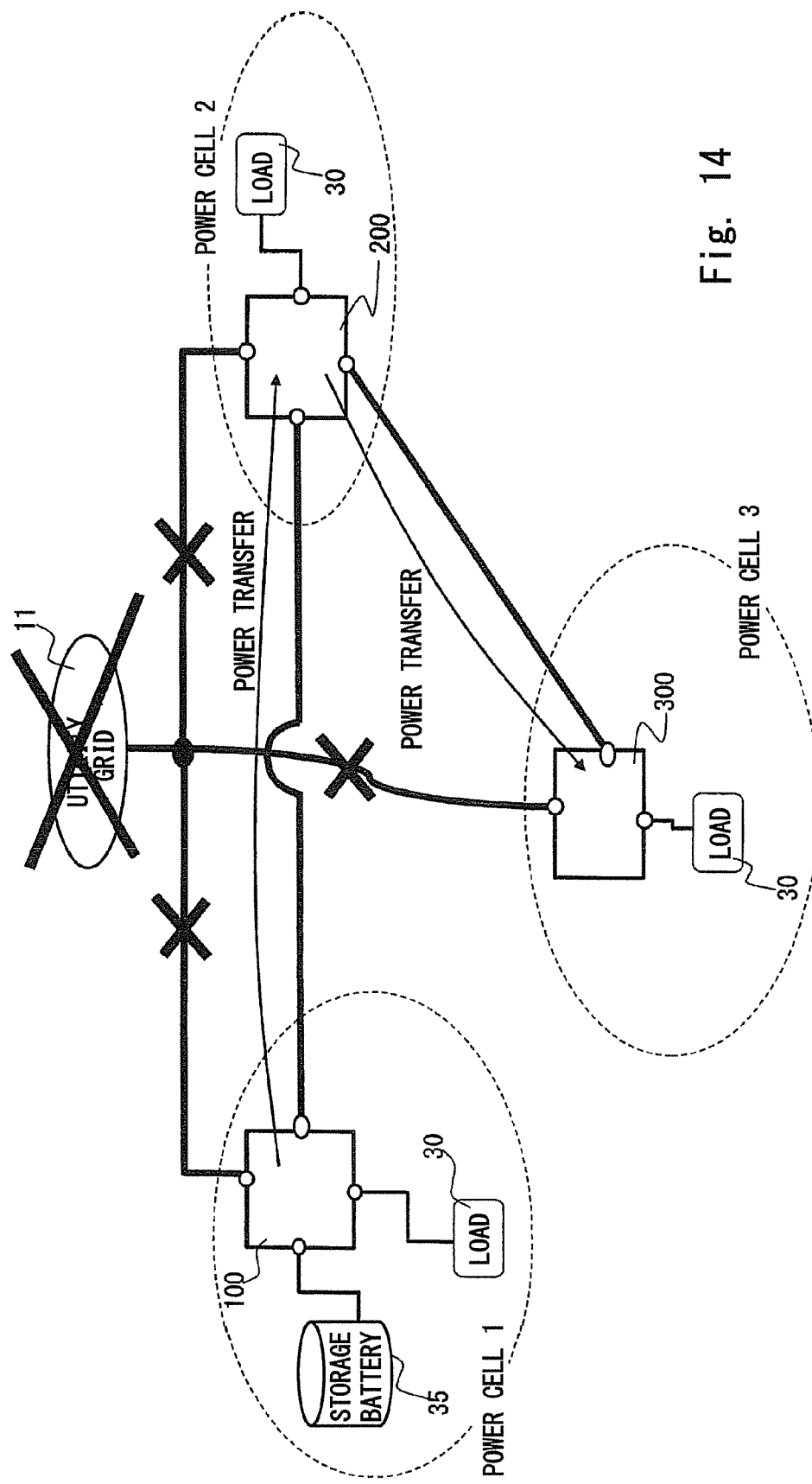
FIG. 14 is a diagram for explaining the first problem in detail as Example 1.

In this case, as shown in FIG. 14, the power stored in the first storage battery 35 of the power cell 1 is to be transferred to the second power cell 2 and the third power cell 3. That is, it is possible to transfer the power in the battery 35 not only to the second power cell 2 but also to the third power cell 3.

However, the first power router 100 and the third power router 300 are connected with each other through the second power router 200. In other words, the power transmission from the first power router 100 up to the third power router 300 is a two-hop. The fact that the power transmission distance increases is the first problem. Furthermore, since the power routers are interconnected asynchronously, the power routers carry out the power conversion upon the transmission/reception of the power. (They carry out the power conversion from AC to DC or from DC to AC.) Consequently, when the second power router 200 is provided in between, additional power conversion loss occurs in the power conversion by the second power router 200.

Figure 15:
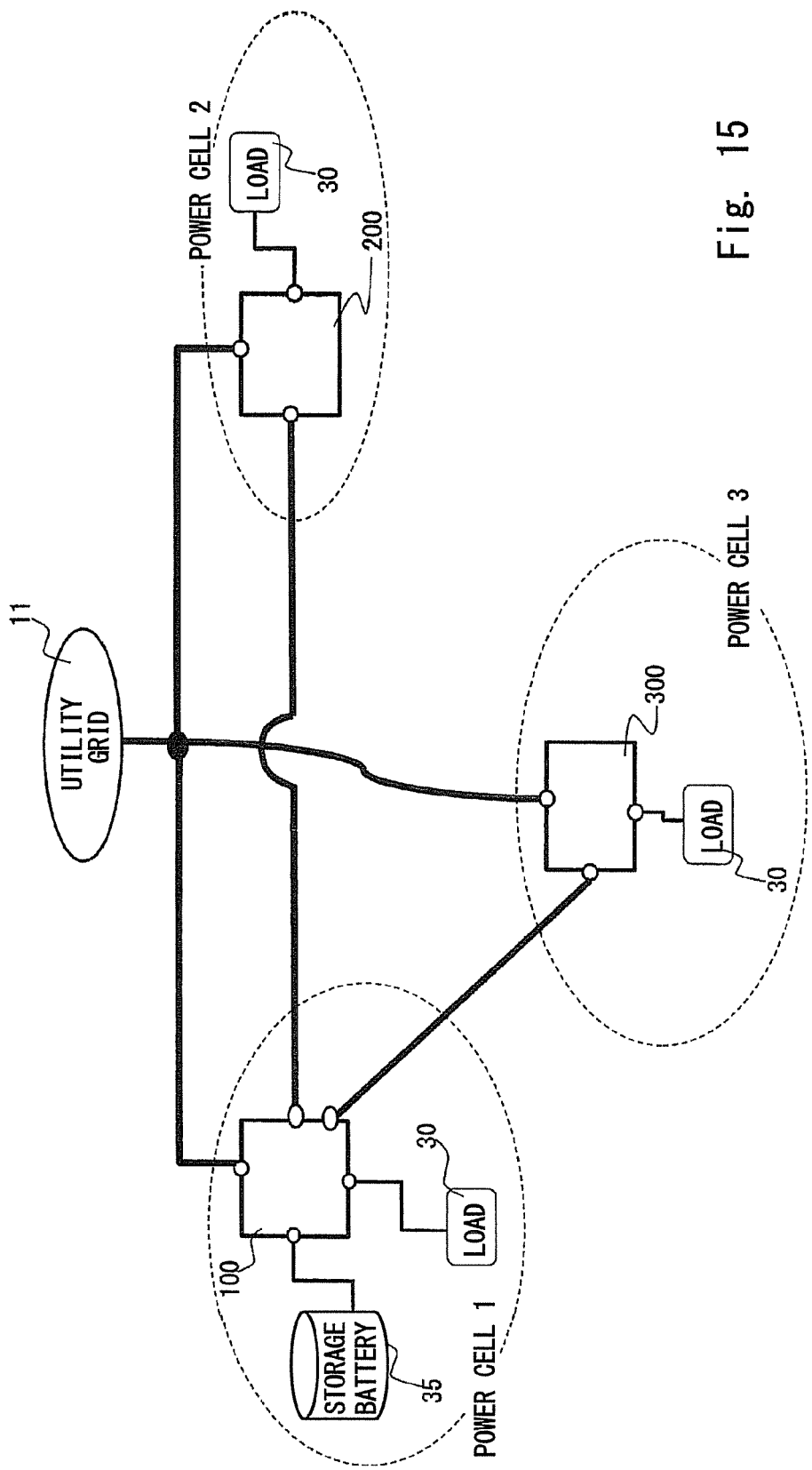
FIG. 15 is a diagram for explaining the first problem in detail as Example 1.
Figure 16:
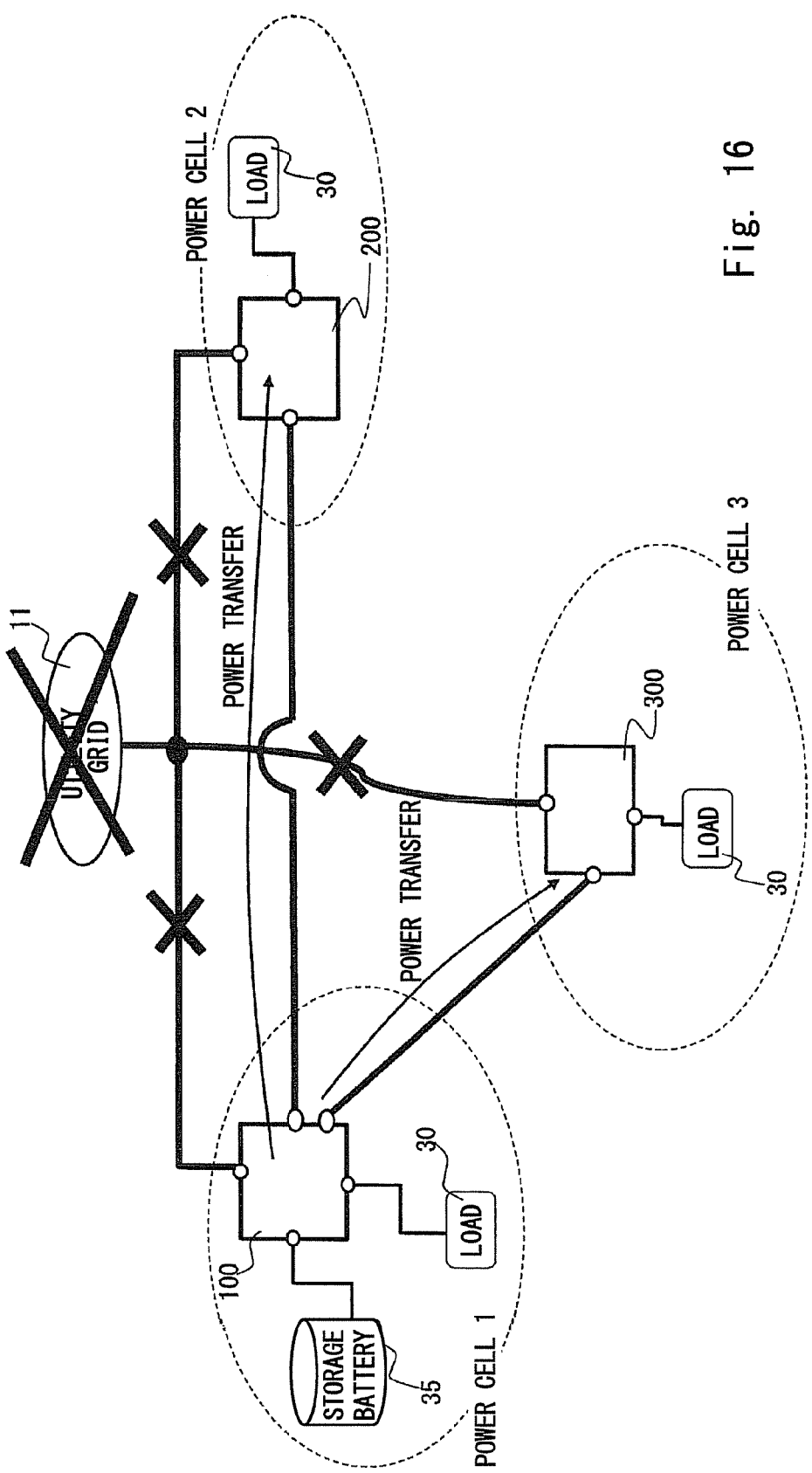
FIG. 16 is a diagram for explaining the first problem in detail as Example 1.

In view of the above, as shown in FIG. 15, it is considered to be better that the third power router 300 is connected to the first power router 100. In this way, if the utility grid 11 breaks down, it is possible to transfer the power efficiently to both the second power router 200 and the third power router 300 from the first storage battery 35 of the power cell 1 (see FIG. 16). However, considering only the efficiency of power transmission, it is better to directly connect the third power router 300 to the power router 100. However, it would be absurd to make such a direct connection if the cost of providing the transmission line between the third power 300 and the first power router 100 is huge.

EXAMPLE 2

Next, the case of Example 2 (FIG. 17-20) will be considered.

Example 2 is different from Example 1 in two points. The first point is that the third power cell 3, which is a new power cell, is provided with a storage battery 35. The second point is that the output of the first storage battery 35 of the power cell 1 is small, and thus this storage battery 35 cannot fully support the first power cell 1 and the second power cell 2 when the utility grid 11 breaks down.

Figure 17:
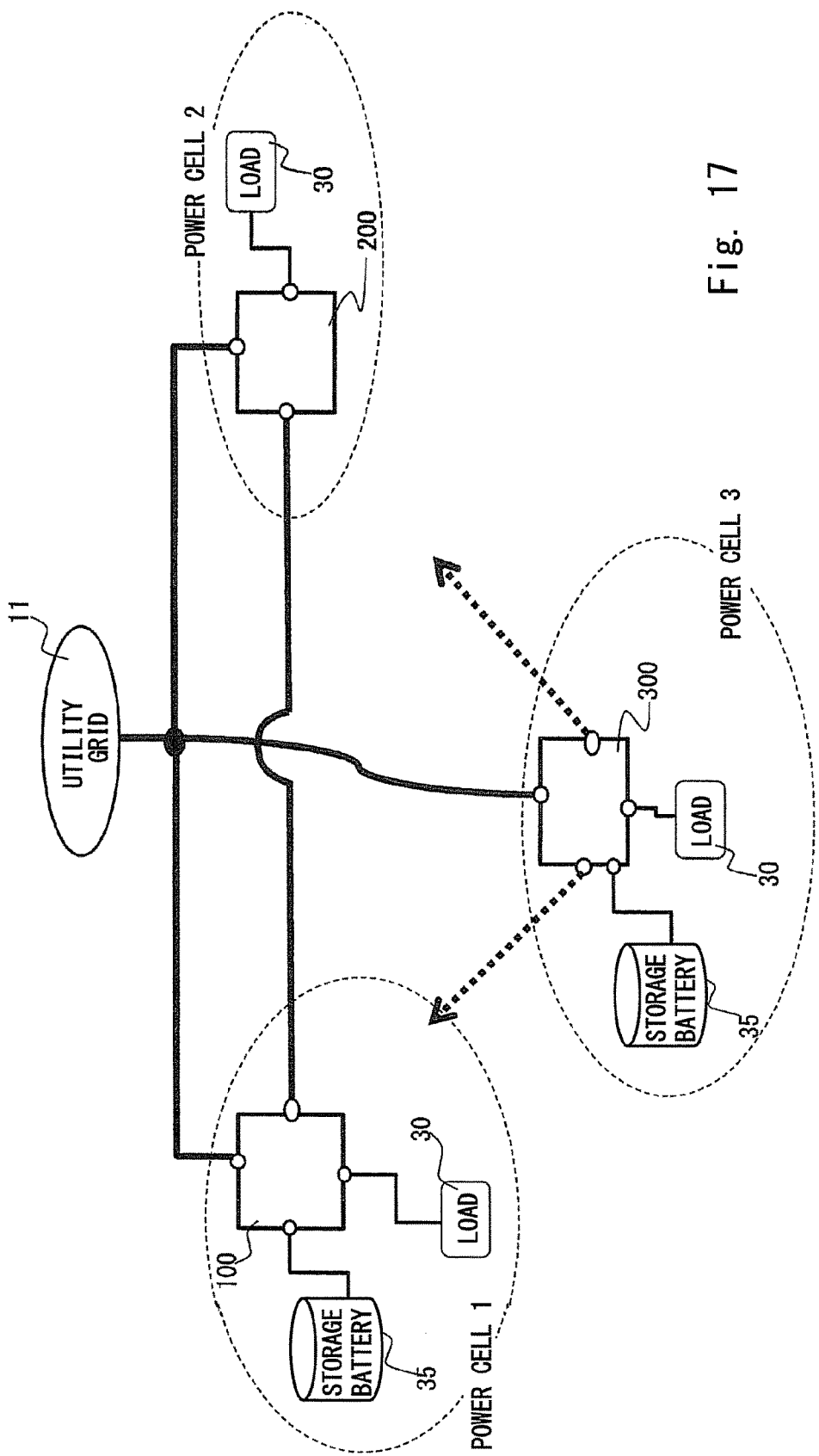
FIG. 17 is a diagram for explaining the first problem in detail as Example 2.
Figure 18:
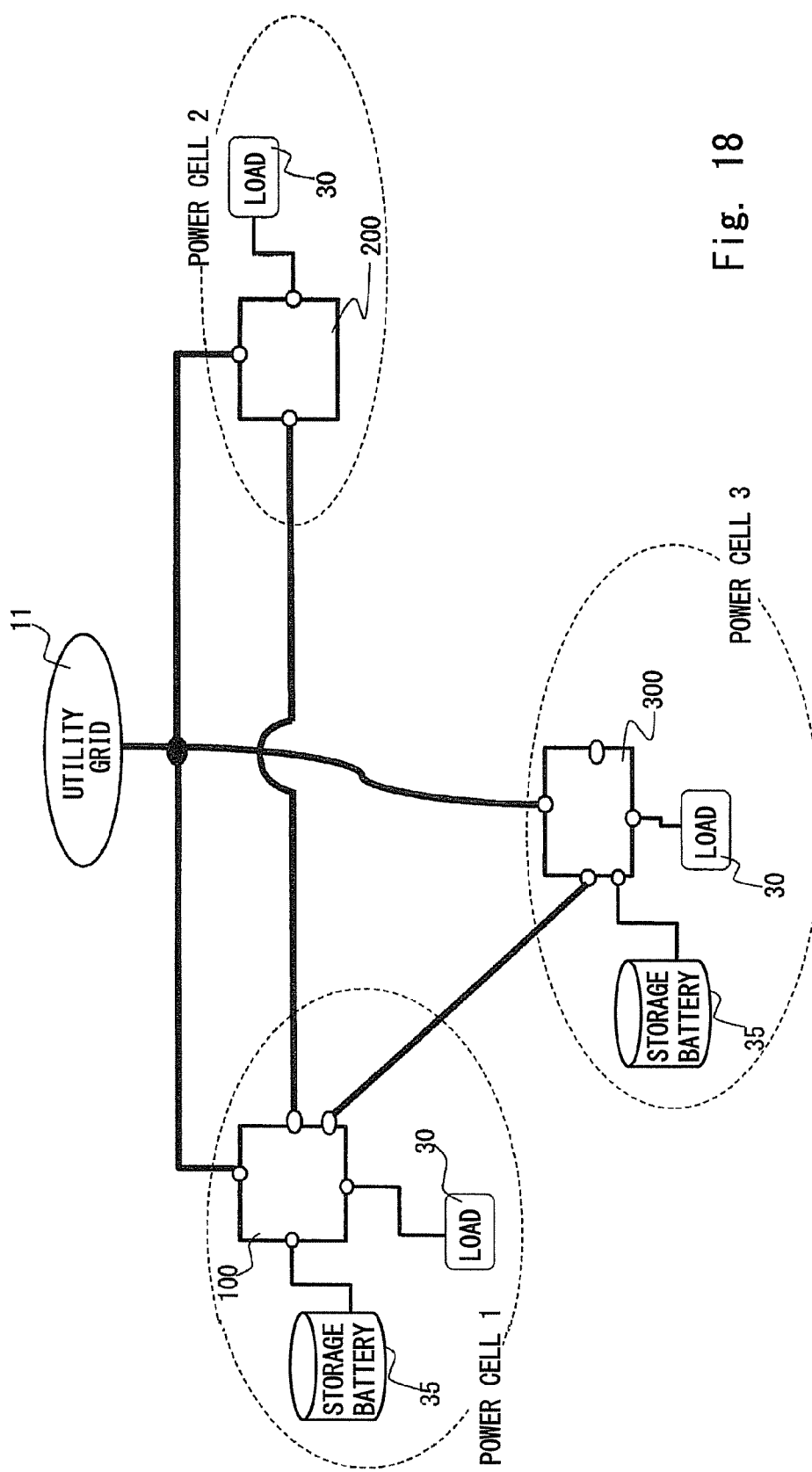
FIG. 18 is a diagram for explaining the first problem in detail as Example 2.
Figure 19:
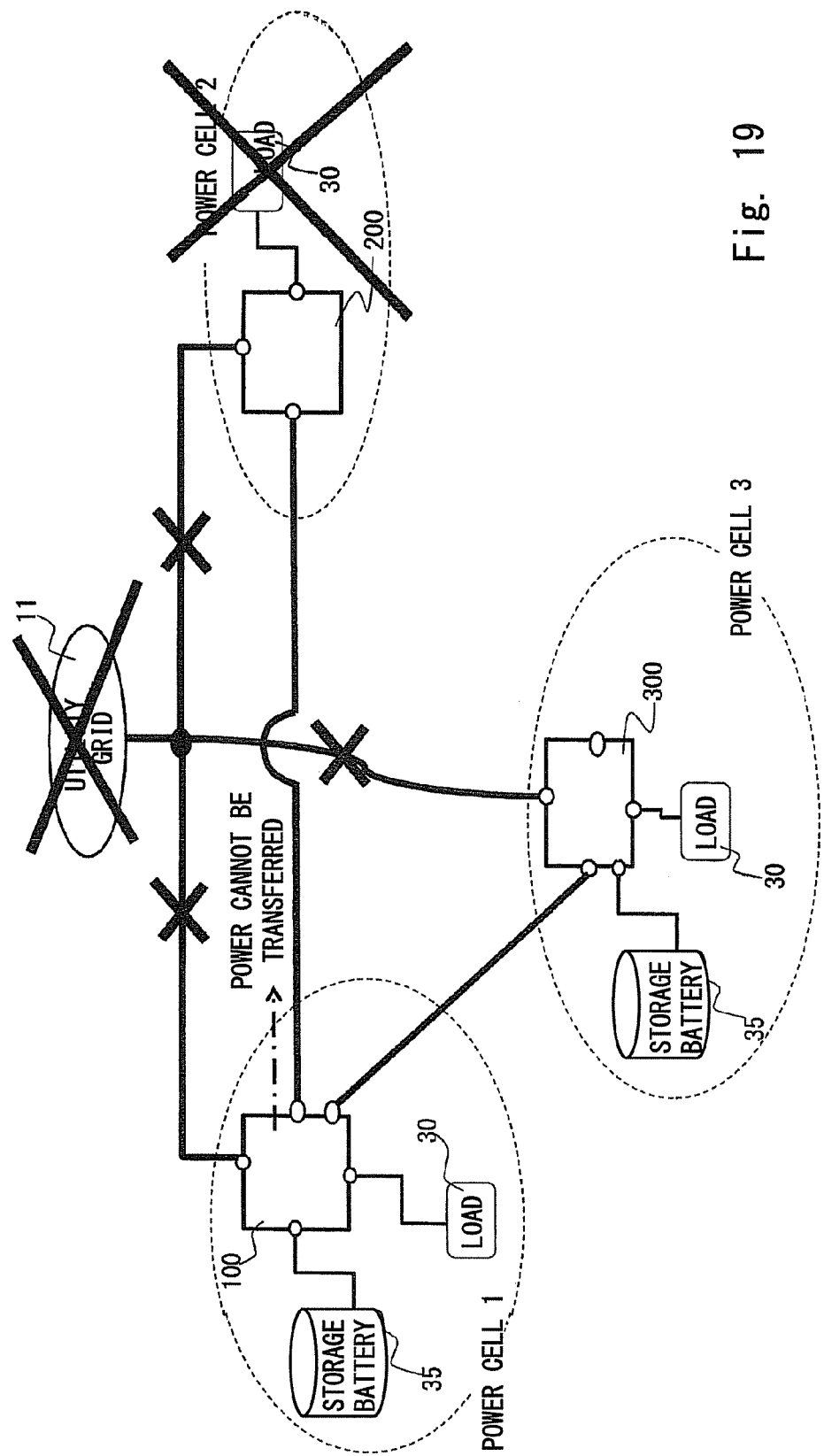
FIG. 19 is a diagram for explaining the first problem in detail as Example 2.

In FIG. 17, the load 30 and the storage battery 35 are connected to the third power router 300 of the third power cell 3. In this situation, it is assumed that the first power cell 1 and the third power cell 3 are connected to each other. This state is shown in FIG. 18. Here, it is assumed that the utility grid 11 breaks down (see FIG. 19). In this case, since the second power cell 2 does not have a battery, it needs the power from the first power cell immediately. However, once most of the power of the storage battery 35 of the first power cell 1 has been used to meet the demand of the first power cell 1, power cannot be transferred to the second power cell 2 from the first power cell 1. Thus, the second power cell 2 goes down.

Moreover, it is also possible for the storage battery 35 of the third power cell to transfer the power to the second power cell via the first power cell. Then the power transmission becomes two-hop, and thus the same problem as described above (Example 1) occurs.

Figure 20:
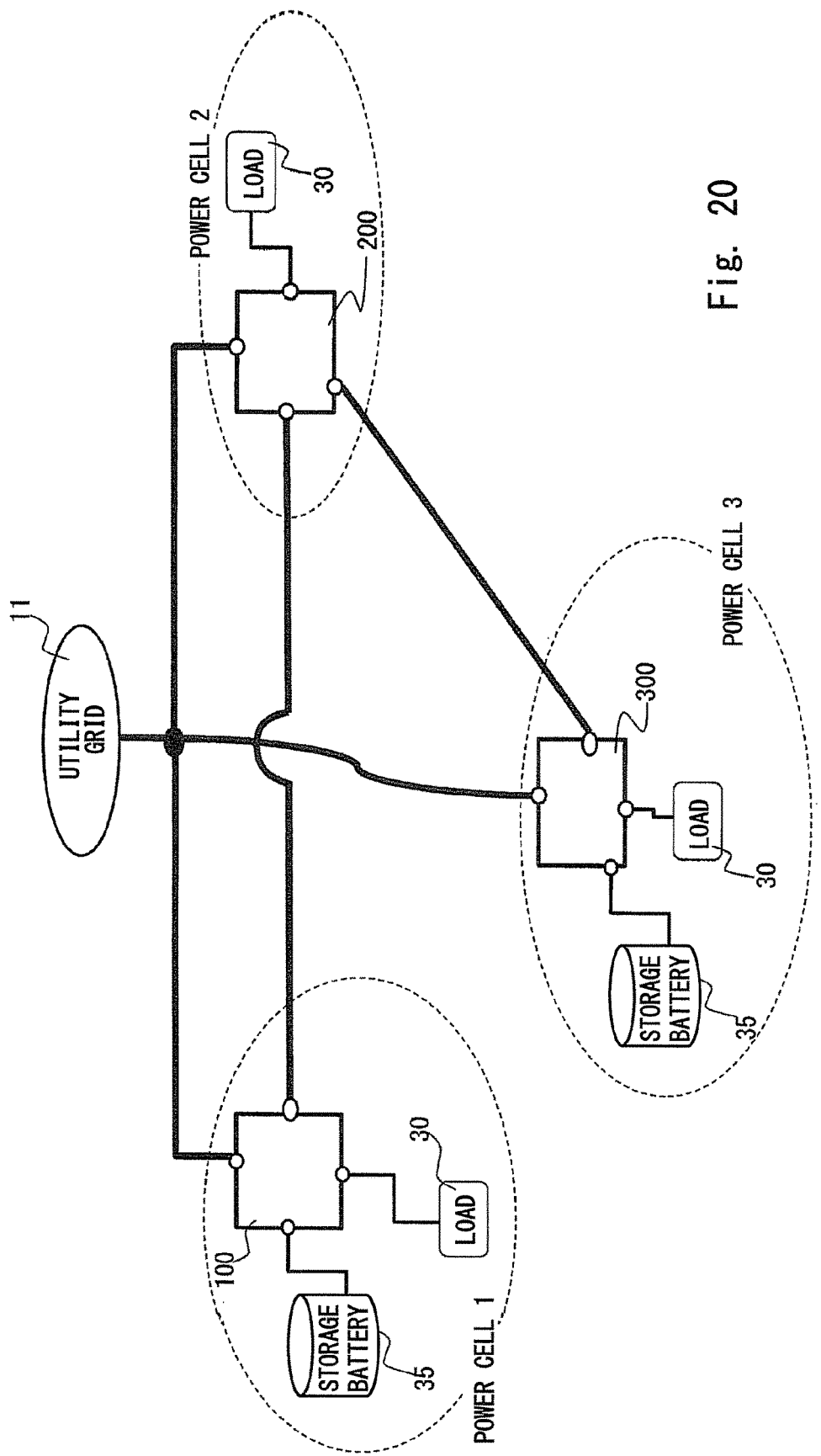
FIG. 20 is a diagram for explaining the first problem in detail as Example 2.

In contrast, as shown in FIG. 20, if the new third power cell 3 is connected to the second power cell 2, the power can be transferred quickly to the second power cell 2 from the third power cells 3 when the utility grid 11 breaks down. Therefore, if there is a storage battery in the power cell which is newly provided, it is desirable to connect the new power cell to the power cell without the storage battery. However, whether or not to make such a connection depends on cost factors such as equipment costs of the wiring and the power transmission loss.

Thus, upon provision of the new power cell, the problem of which one of the existing power cells the new power cell should be connected to has to be solved in order to create a stable power network system.

This is the first problem.

In addition, there is a second problem.

When connecting the power routers, rather than just connecting the wirings, a connection which meets the restrictions should be made to be able to carry out a normal operation. Specifically, the operation mode is set for each leg of the power router, and the operation of each leg differs according to the operation mode.

When newly connecting the power routers, the combination of the operation modes of the legs must be considered. As described above regarding the connection restrictions of the operation modes of the legs, the power routers must be connected to be able to achieve the unimpeded power transfer between the power routers when the utility grid breaks down. The present inventors have found that, upon the provision of the new power router, the operation mode of each router must be set after due consideration of the response in the case of a previous power failure when the new power cell and the existing power cell are connected to each other. Otherwise, even if the wirings themselves are connected, a normal operation cannot be performed, and thus the power transfer cannot be performed, and eventually it becomes impossible to maintain the power system.

The second problem will be described in a little more detail.

Figure 21:
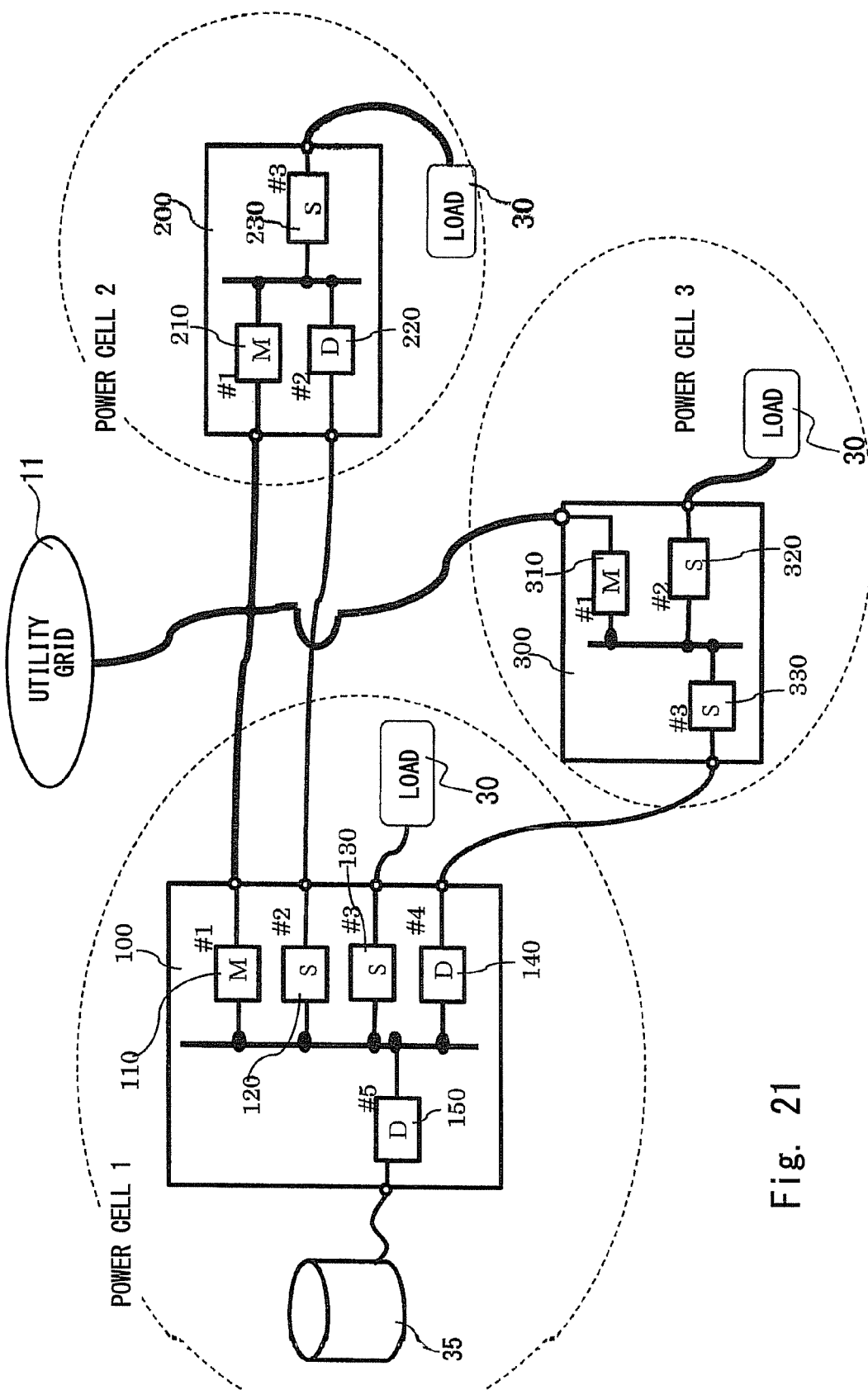
FIG. 21 is a diagram for explaining a second problem.

See FIG. 21.

In FIG. 21, it is assumed that the first power cell 1 and the second power cell 2 are existing power cells, and it is desired to newly provide the third power cell 3.

It should be noted that the first power cell 1 includes the first power router 100, the load 30, and the storage battery 35. The second power cell 2 includes the second power router 200 and the load 30. The new third power cell 3 includes the third power router 300, and the load 30.

The master legs 110, 210, 310 of the first power router 100, the second power router 200 and the third power router 300 are connected to the utility grid 11, respectively. Further, the stand-alone leg 120 of the first power router 100 and the designated power transmission/reception leg 220 of the second power router 200 are connected to each other. The designated power transmission/reception leg 150 is connected to the storage battery 35. The stand-alone legs 130, 230, 320 of the first power router 100, the second power router 200 and the third power router 300 are connected to the loads 30, respectively. Here, upon the connection between the first power router 100 and the third power router 300, it is assumed that the designated power transmission/reception leg 140 of the first power router 100 and the stand-alone leg 33 of the third power router 300 are connected to each other. This is the combination that allows this connection relationship, as previously described.

Figure 22:
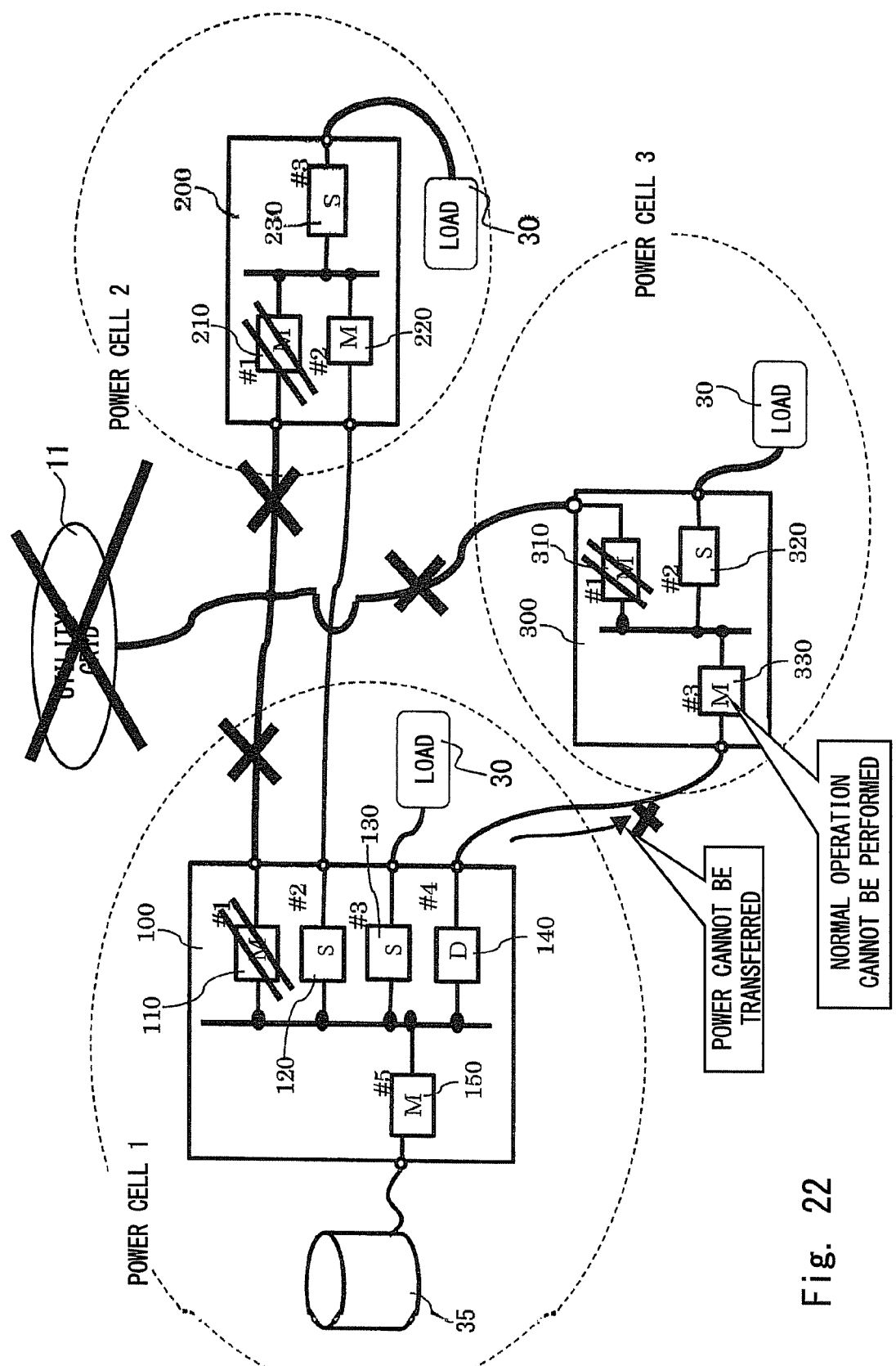
FIG. 22 is a diagram for explaining the second problem.

It is assumed that the utility grid 11 breaks down (see FIG. 22).

Even if the utility grid 11 breaks down, by transferring the power in the storage battery 35 of the first power cell 1 to the second power cell and the third power cell 3, the power system can be maintained as a whole.

Therefore, when it is detected that the utility grid 11 has had a break down, an operation switching is performed as follows. (The switching state is shown in FIG. 22.)

(Note, various ways on how to detect whether the utility grid 11 has had a break down and how to indicate the switching operation to each power router may be considered.

The energy supplied from the connection partner (the utility grid in this case) of the master leg for each power router is monitored. When the connection partner of the master leg goes down, the operation mode of each leg may be subjected to switching in a predetermined procedure. Alternatively, when the utility grid 11 breaks down, the switching instruction of the operation mode of the leg may be issued to each power router from the management server.)

First, focusing on the first power router 100, a fifth leg 150 is connected to the storage battery 35 and its operation mode is the designated power transmission/reception mode. Since it is desired that the first power router 100 maintain the voltage of the DC bus by using the power of the storage battery 35, the operation mode of the fifth leg 150 is switched from the designated power transmission/reception mode to the master mode. In the second power router 200, since it is desired that the power be transferred from the first power router 100, the operation mode of the second leg 220 is switched from the designated power transmission/reception mode to the master mode. In the third power router 300, since it is desired that the power be transferred from the first power router 100, the operation mode of the third leg 330 is switched from the stand-alone mode to the master mode. In short, the legs which are connected to the partner having the excessive power are changed to the master legs.

However, even if the operation mode of each leg is switched in this manner, it is not always true that the power interchange is performed normally. In the relationship between the first power router 100 and the second power router 200, it is true that the power transfer from the first power router 100 to the second power router 200 is performed normally.

The partner to which the second leg 220 of the second power router 200 is connected is the second leg 120 of the first power router 100. The second leg 120 of the first power router 100 is operated in the stand-alone mode. Thus, the second leg 120 of the first power router 100 can transfer the energy that the second leg 220 of the second power router 200 requires.

Meanwhile, it is not possible to perform normal power interchange in this state between the first power router 100 and the third power router 300. Although the third leg 330 of the third power router 300 is the master leg, the connection partner of this master leg 330 is the fourth router 140 of the first power router 100, and the fourth router 140 of the first power router 100 is the designated power transmission/reception leg. This connection is a prohibited combination as described above. Therefore, if the third power router 300 tries to continue to operate by the power transferred from the first power router 100, it is not possible to receive the power from the first power router 100 in this state.

Incidentally, in the state shown in FIG. 22, it may be considered to switch the operation mode of the fourth leg 140 of the first power router from the designated power transmission/reception mode to the stand-alone mode. However, it is not desirable to switch the operation modes of the legs in both the first power router and the third power router as the response to the power failure. The operation in which the operation mode of the fourth leg 140 of the first power router 100 is switched from the designated power transmission/reception mode to the stand-alone mode, and the operation mode of the third leg 330 of the third power router 300 is switched from stand-alone mode to the master mode requires a fair amount of time, and thus there is a strong possibility that it will not be possible to respond to a power failure quickly.

Figure 23:
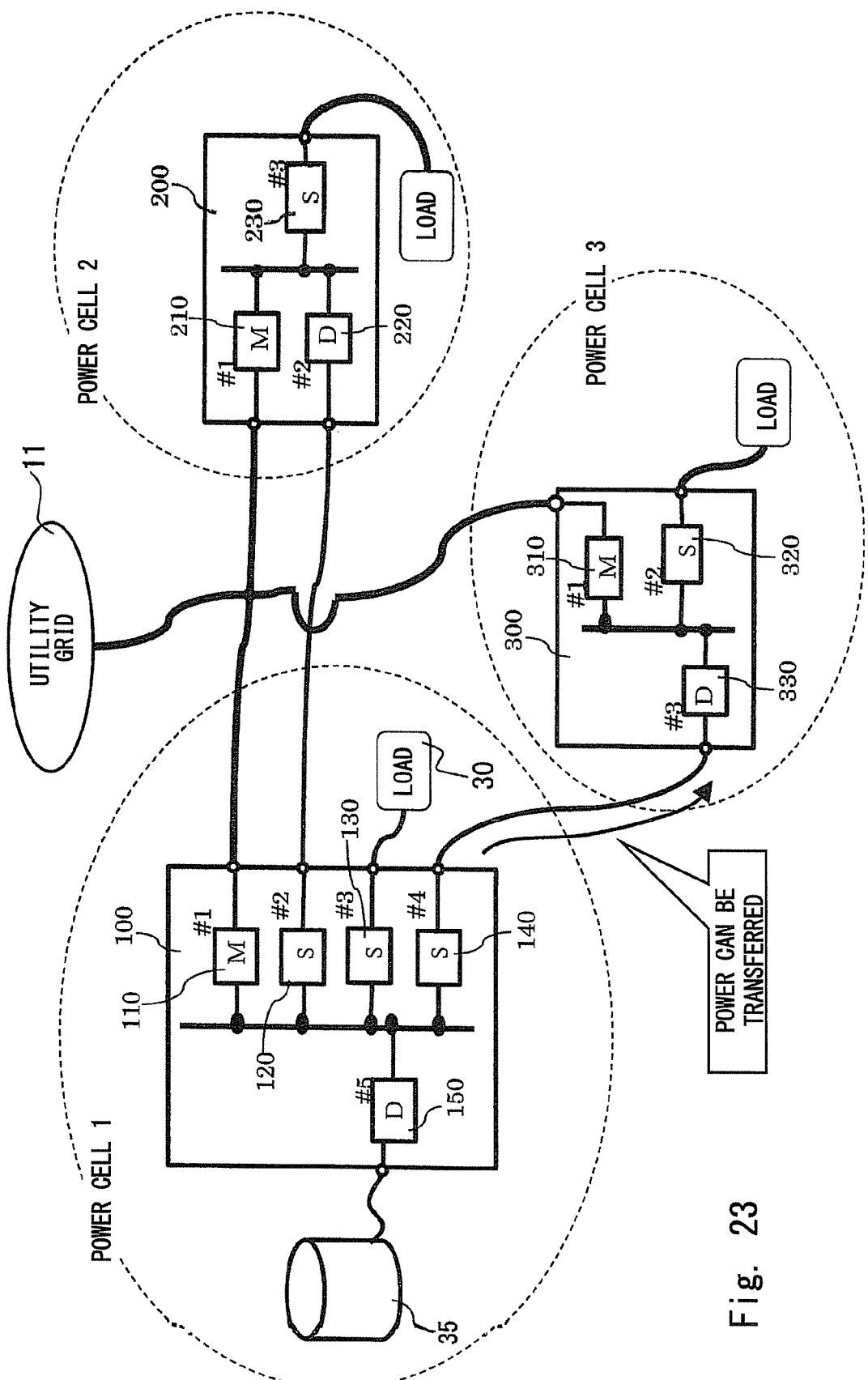
FIG. 23 is a diagram for explaining the second problem.

Thus, when the response for the power failure is considered, and when the fourth leg 140 of the first power router 100 is connected to the third leg 330 of the third power router, the fourth leg 140 of the first power router 100 must be a stand-alone leg as shown in FIG. 23.

As described above, when the new power cell is newly established, the power routers should be connected to each other to achieve the smooth power transfer between the power routers when the utility grid breaks down in addition to determining to which of the existing power cells the new power cell should be connected. That is, the operation mode of the leg should be taken into account sufficiently.

This is the second problem.

Through their extensive research, the present inventors have succeeded in developing a method of selecting an optimum connection partner by comprehensively considering various circumstances.

First Embodiment

A first embodiment of the present invention will be described.

Figure 24:
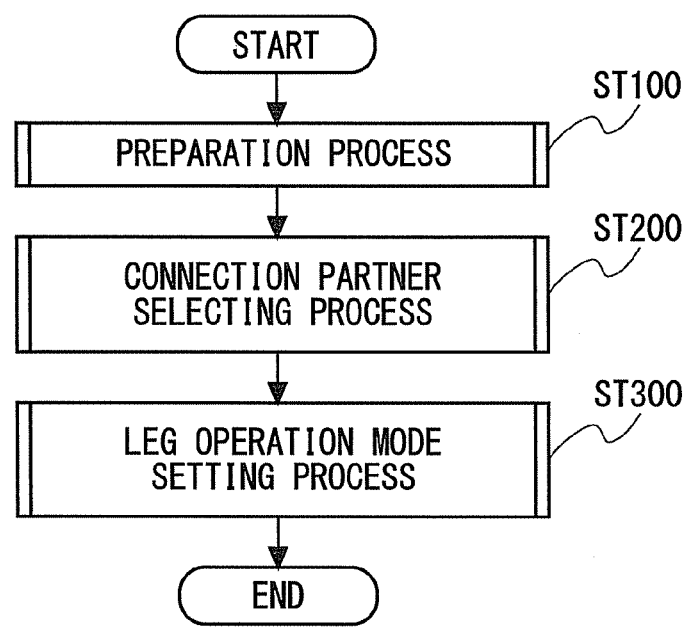
FIG. 24 is a flow chart showing an overall processing procedure of a present embodiment.

FIG. 24 is a flowchart showing an overall processing procedure of this embodiment.

This embodiment includes a preparation process ST100, a connection partner selecting process ST200, and a leg operation mode setting process ST300. That is, necessary information is prepared in the preparation process ST100, and a selection of the connection partner is performed based on this information (ST200).

Furthermore, after the connection partner is determined, the operating mode of the leg is set (ST300).

Each process will be described in detail.

Figure 25:
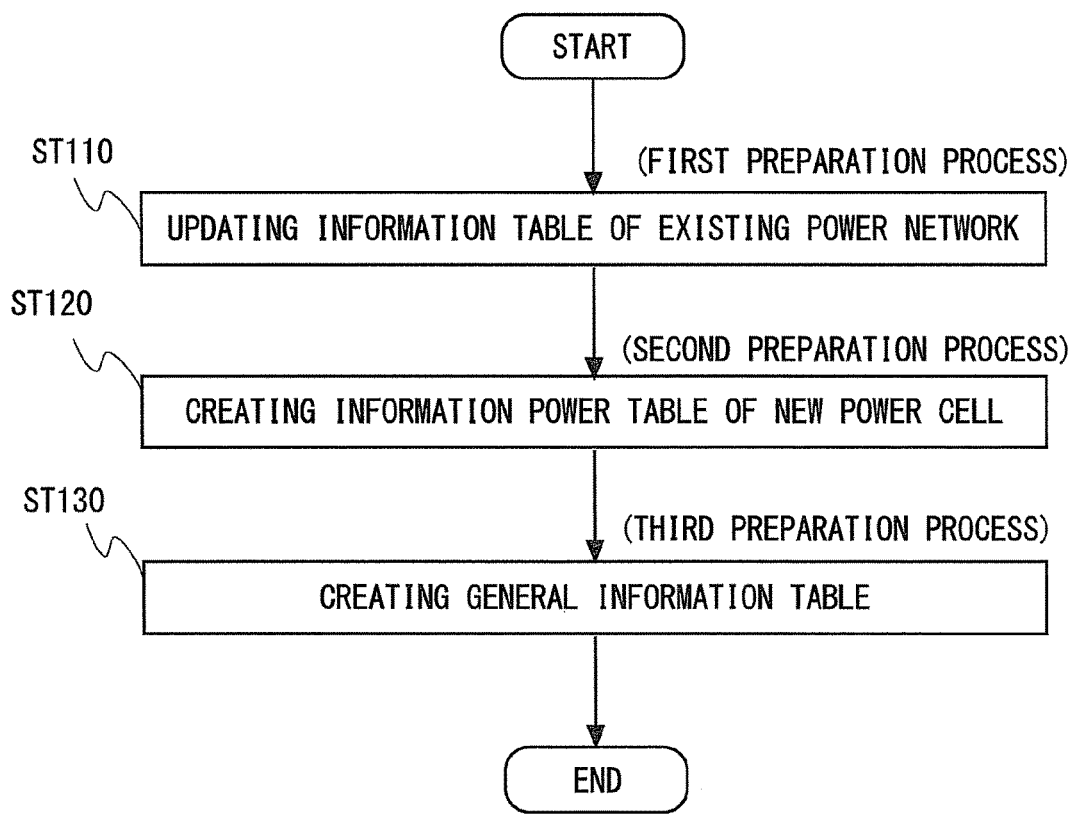
FIG. 25 is a flow chart showing a detailed procedure of a preparation process.

A detailed procedure of the preparation process ST100 is shown in the flowchart of FIG. 25.

First, as a first preparation process ST110, the information table of the existing power network system is updated.

An example of the information table of the existing power network is shown in FIG. 26.

The information table of the existing power network is a summary of information of the power cells which already exist.

In this information table, an ID number is assigned to each power cell, and information such as a demanded power, a supplied power, an excessive power, and a place are summarized with respect to each power cell.

The demanded power is a power consumed by the load within the power cell, and is represented in watts [W].

For example, when a contracting wattage is determined with respect to each household, factory and commercial building that exists in the power cell, the demanded power may be a total of this wattage.

Alternatively, it may be a power which is a minimum required during a power failure (when the utility grid is down).

For example, a power which hospitals absolutely require and a power required for maintaining lifelines and the like are estimated and summarized, and it may be the demanded power.

The supplied power is a power value that the distributed power supply in the power cell can output.

For example, when the power generation facility and the storage equipment are provided in the power cell, the supplied power may be a sum of their maximum output.

In short, it is the power value that the distributed power supply in the power cell can supply even during the power failure (when the utility grid is down.)

If the power generation facility is the kind which uses natural energy, for example, the supplied power may be the design maximum output, or it may be estimated suppliable power from past performance.

The excessive power is the power in the power cell in the event of a power failure (when the utility grid is down).

Typically, it is sufficient to use the value obtained by subtracting the demanded power from the supplied power.

If the excessive power is a positive value, this means that power is left over in the power cell even during the power failure (when the utility grid is down).

On the other hand, when the excessive power is a negative value, this means that the power is short in the power cell even during the power failure (when the utility grid is down).

Next, as a second preparation process ST120, an information table of the new power cell is created.

The information table of the new power cell is shown in FIG. 27.

In the information table of the new power cell, together with the ID number, a demanded power, a supplied power, an excessive power, and a place are summarized.

Furthermore, as a third preparatory process ST130, a general information table is crated (see FIG. 28).

The general information table is one obtained by integrating the information table of the existing power network (FIG. 26) and the information table of the new power cells (FIG. 27). Furthermore, it is obtained by adding a cost and the efficiency of power transmission.

The cost is a sum of installation costs and operational costs which are conceivable if it is assumed that the new power cell will be connected to the existing power cell, and is calculated for each existing power cell.

Installation costs include, for example, construction work costs, equipment costs and the like.

For example, construction work costs and equipment costs are also pushed up if they are separated by a great distance or if a cable is set up beyond mountains, the valleys or seas.

The efficiency of power transmission means an efficiency of power transmission after considering the power lost due to the power transmission.

For example, if 5% of the power is lost due to the power transmission, the efficiency of power transmission is 0.95.

As a power transmission distance gets longer, the efficiency of power transmission decreases.

(In addition, the efficiency of power transmission is also changed by the transmission voltage.)

The preparation process ST100 comes to an end when it has been possible to create the general information table as just described, and then the connection partner selecting process ST200 will be performed.

Figure 29:
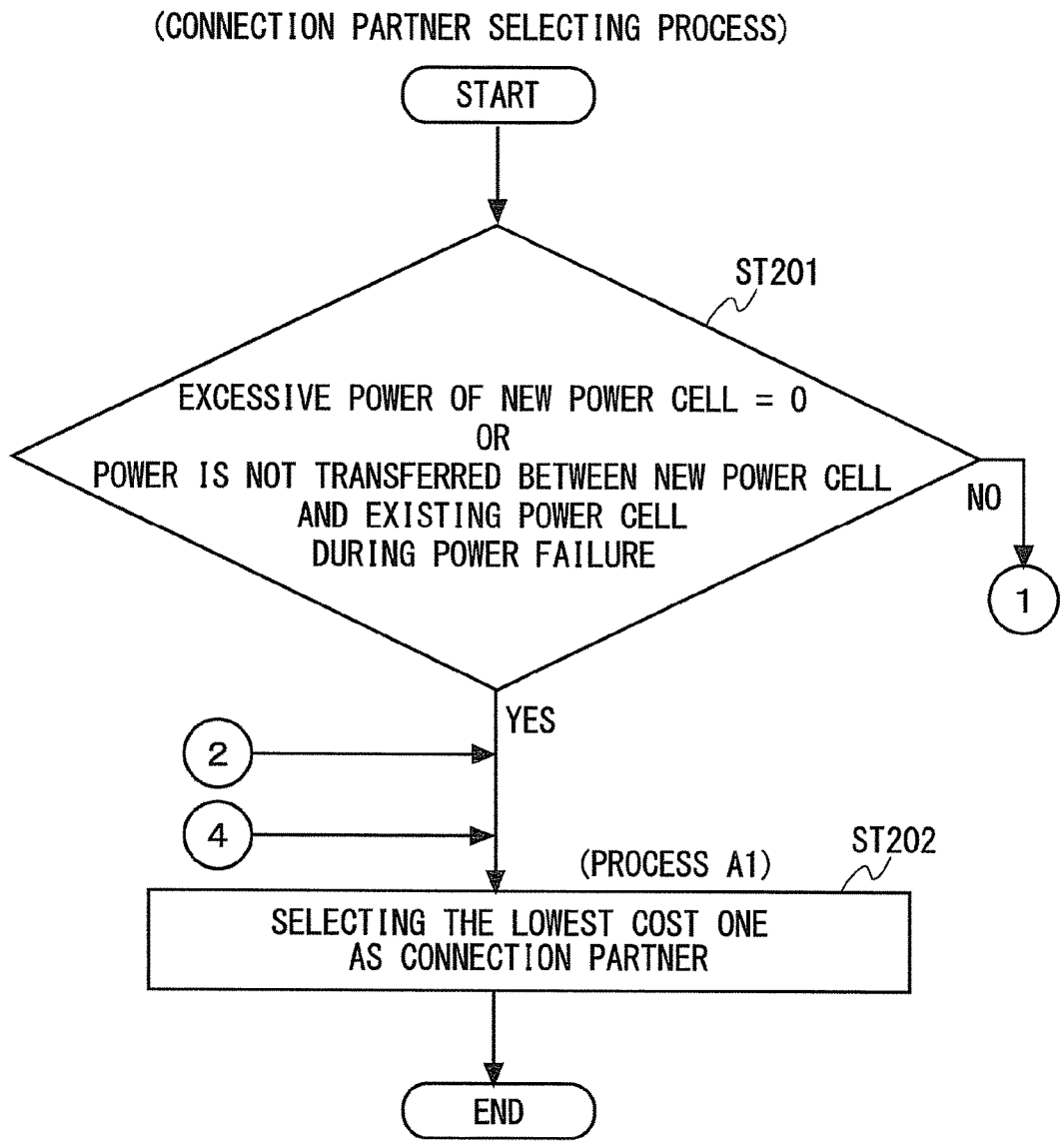
FIG. 29 is a flow chart showing a procedure of a connection partner selecting process.

With reference to flowcharts in FIGS. 29 to 31, the connection partner selecting process ST200 will be described.

First, it is determined whether to build a dependency upon due consideration of the response to the power failure between the new power cell and the existing power network (ST201).

That is, if the excessive power of the new power cell is 0, the new power cell cannot transfer the power to other power cells, and does not need to receive the power from other power cells.

Alternatively, at the discretion of the operator side of the power system, there is a case where it is not desired to build the dependency between the new power cell and the existing power network during the power failure (when the utility grid is down).

If the dependency upon due consideration of the response to the power failure is not built between the new power cell and the existing power network (ST201: YES), the lowest cost power cell from among the existing power cells is selected as the connection partner of the new power cell (ST202).

On the other hand, if the dependency upon due consideration of the response to the power failure is built between the new power cell and the existing power network (ST201: NO), the flow branches depending on whether the excessive power of the new power cell is negative or positive.

First, if the excessive power of the new power cell is positive (ST203: YES), the existing power cell that meets "a first condition group" is searched.

Here, "the first condition group" is represented as follows.

[The excessive power of the existing
power cell]<0           (Condition expression 11), and,

[The excessive power of the new power cell]×(The
efficiency of power transmission)+[The excessive power of the existing
power cell]>0           (Condition expression 12), and,

[The cost]≤(A predetermined cost upper
limit)                  (Condition expression 13)

The fact that the excessive power of the new power cell is positive means that there is room for transmitting the power to another power cell during the power failure.

Thus, the existing power cell in which the power is insufficient in the event of a power failure is preferable as the connection partner of such new power cell.

Therefore, the condition expression 11 is required.

Further, it is prohibited that the sum of the excessive of its own and the negative component of the connection partner become negative.

When the sum of the excessive of its own and the negative component of the connection partner become negative, both of them become down in the event of a power failure.

Further, it is required to take the efficiency of power transmission into account.

Accordingly, the conditional expression 12 is required.

Furthermore, even if there is an existing power cell which satisfies the conditional expression 1 and the conditional expression 2, there is no sense in connecting this existing power cell and the new power cell if it costs too much.

For example, if the cost of installing a cable exceeds the cost of installing the new distributed power supply, there is no sense in installing a long distance cable purposely for power transfer.

Therefore, the condition expression 13 is required.

If there are one or more existing power cells that satisfy the first condition group (ST205: YES), the lowest cost one among them is selected as the connection partner of the new power cell (ST206).

Then, a first update process is performed (ST207).

The first update process is one that updates the excessive power as follows.

The connection partner of the new power cell is assumed to be an existing power cell Y.

[The excessive power of the new power cell after
the update]: [The excessive power of the new
power cell before the update]+[The excessive
power of the existing power cell Y before the
update]÷(The efficiency of power transmission)

[The excessive power of the existing power cell Y
after the update]: 0

The excessive power of the new power cell after the update represents the power which is left over even if the power which corresponds to the negative component of the existing power cell Y is transferred.

The excessive power of the existing power cell Y after the update is determined to be 0 uniformly.

Here, because the existing power cell Y and the new power cell are connected to each other, it may be thought that the power of the distributed power supply the new power cell has may be included in the excessive power of the existing power cell Y after the update.

In other words, the excessive power of the existing power cell Y after the update is made to be a positive value rather than 0, and the excessive power of the new power cell after the update may be reduced by the amount of the positive value.

The fact that the excessive power of the existing power cell Y after the update is made to be a positive value indicates that the excessive power of the new power cell can be transferred to another power cell via the existing power cell Y.

In the present invention, the thought described above is not definitely excluded, but it is not preferable to "sublet" such power in view of power efficiency and a possibility that the calculation of the condition expression may become complicated. In the present embodiment, the excessive power of the existing power cell Y after the update is determined to be 0 uniformly.

After the update process 1 (ST207), a search is performed to see whether any further existing power cell that satisfies "the first condition group" exists (ST204), and steps ST204 to ST207 are repeated until the existing power cell that satisfies the first condition group is eliminated.

In this way, upon installing the new power cell of which the excessive power is positive, the proper connection partner can be selected.

In ST205, if there is no existing power cell that satisfies the first condition group (ST205: NO), the process branches according to whether or not there was even one existing power cell which satisfies the first condition group.

If there is no existing power cell which meets the first condition group (ST208: YES), which means that there is no existing power cell which makes the dependency between the new power cell, the process returns to ST202, the lowest cost power cell is selected as the connection partner and the process ends.

If there are one or more existing power cells that satisfies the first condition group, and if a loop from ST204 to ST207 is performed more than once (ST208: NO), the process immediately ends.

Figure 30:
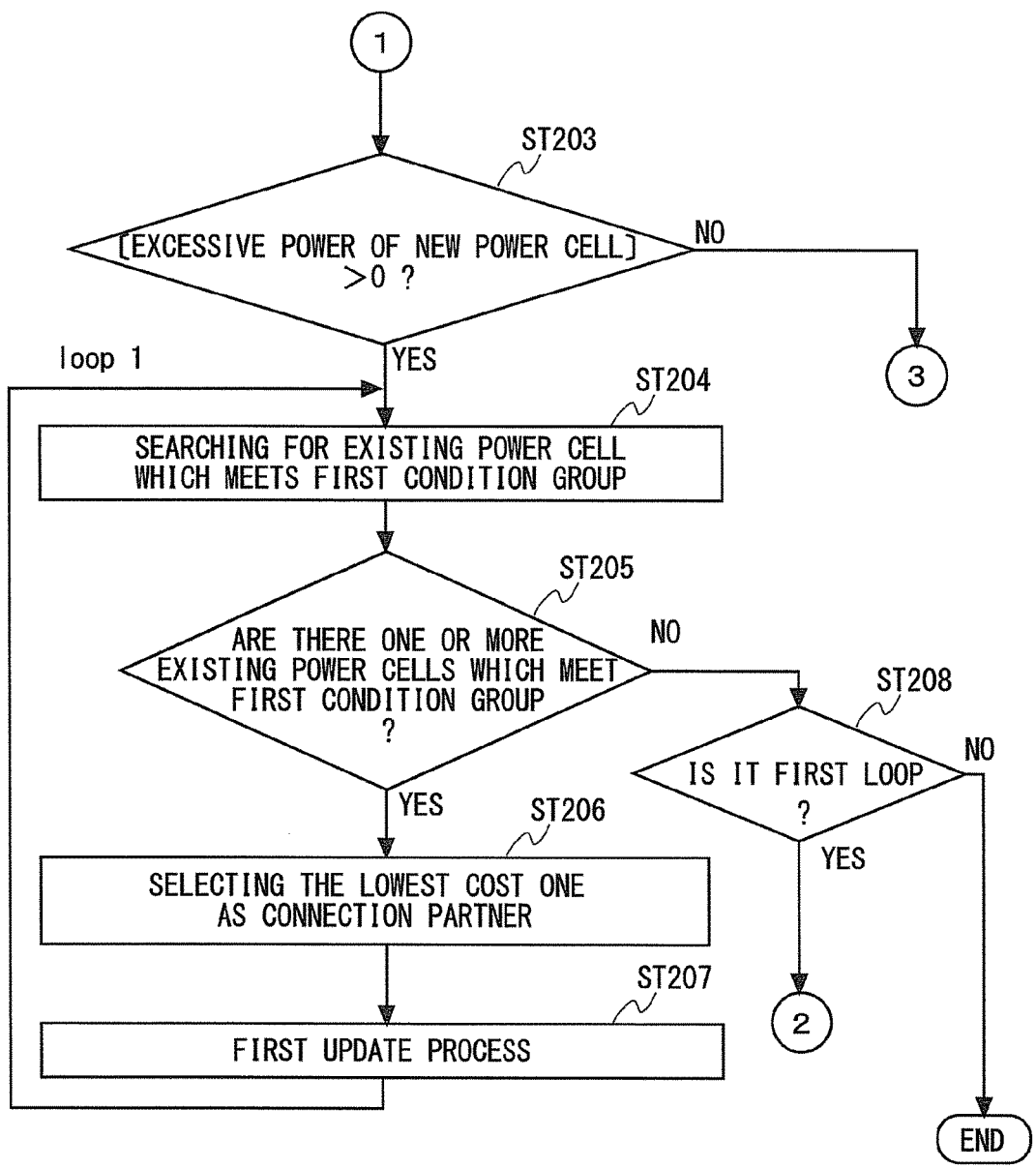
FIG. 30 is a flow chart showing a procedure of a connection partner selecting process.
Figure 31:
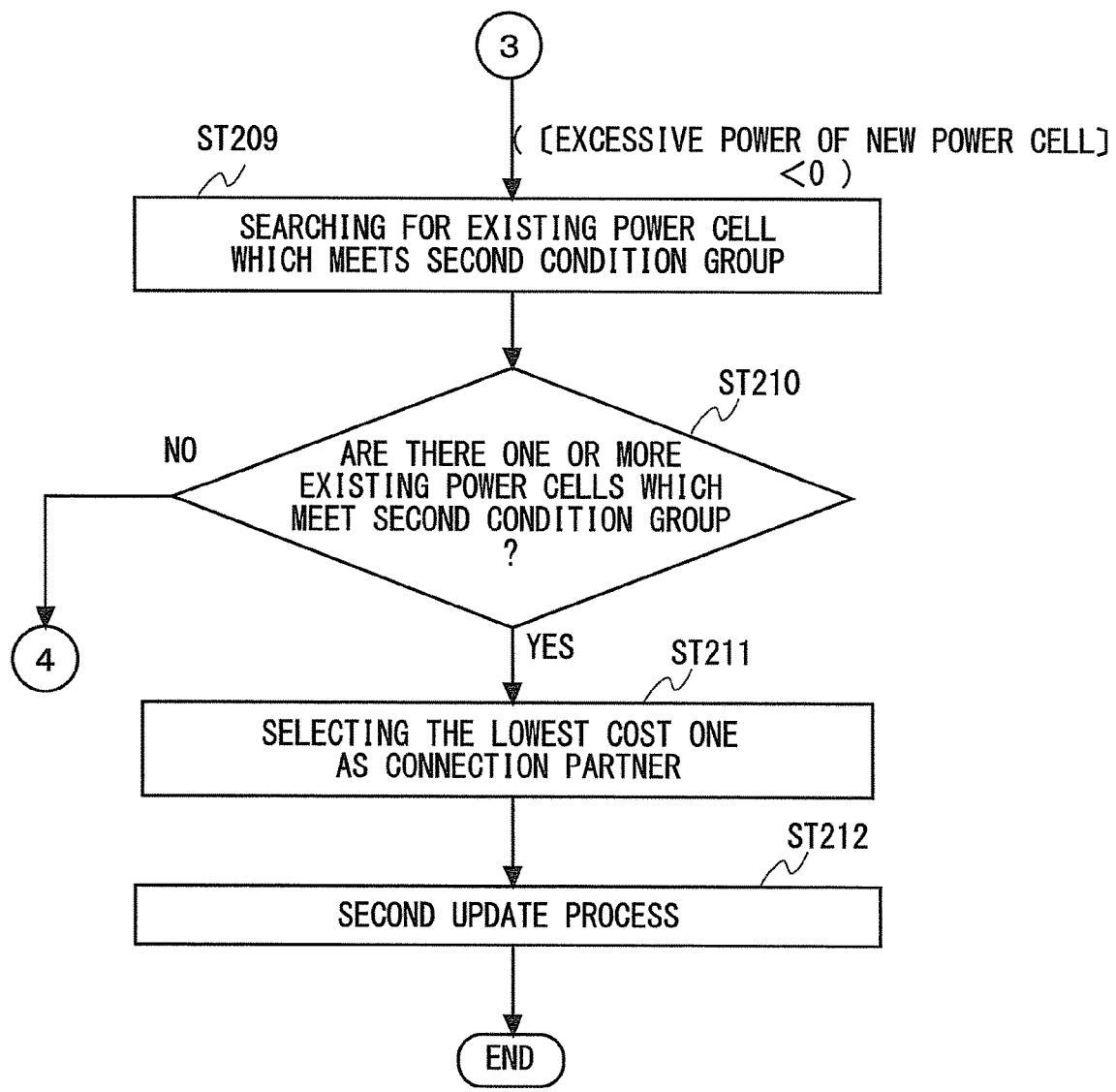
FIG. 31 is a flow chart showing a procedure of a connection partner selecting process.

Here, in FIG. 30, although the case has been described where the loop from ST204 to ST207 is further repeated until the existing power cell that satisfies the first condition group is undetected after the update process 1 (ST207), the process may be terminated without performing the loop from ST204 to ST207 when one connection partner of the new power cells is determined.

Next, the process when the excessive power of the new power cell is negative (ST203 NO) will be described.

If the excessive power of the new power cell is negative (ST203: NO), a search for an existing power cell that satisfies "a condition group 2" is performed.

"The second condition group" is indicated as follows.

[The excessive power of the new power cell]+[The excessive power of the existing power cell]× (The efficiency of power transmission)≥0    (Condition expression 21), and,

[The cost]≤(A predetermined cost upper limit)    (Condition expression 22).

The fact that the excessive power of the new power cell is negative means that it is required that the new power cell receive the power from another power cell in the event of a power failure.

Thus, the existing power cell which has the excessive power during the power failure is preferable as the connection partner of such new power cell, if the sum of its own excessive power and the negative component of the connection partner (the new power cell) does not become negative.

Therefore, the condition expression 21 is required.

(Also, it can be understood that [The excessive power of the existing power cell]<0 is of course true if the conditional expression 21 is met.)

Furthermore, for the same reason as the condition expression 13, even if there is an existing power cell which satisfies the conditional expression 21, since there is no sense in connecting this existing power cell and the new power cell to each other if it costs too much, the condition expressing 22 is required.

If there are one or more existing power cells that satisfy the second condition group (ST210: YES), the lowest cost one among them is selected as the connection partner of the new power cell (ST212).

Then, a second update process is performed (ST207).

The second update process is one that updates the excessive power as follows.

The connection partner of the new power cell is assumed to be an existing power cell Z.

[The excessive power of the new power cell after the update]: 0 [The excessive power of the existing power cell Z after the update]: [The excessive power of the existing power cell Z before the update]+[The excessive power of the new power cell before the update]÷(The efficiency of power transmission).

After the second update process, the process ends.

In this way, upon installing a new power cell of which the excessive power is negative, the proper connection partner is selected.

In ST210, if there is no existing power cell that meets the second condition group (ST210: NO), which means that there is no existing power cell which makes the dependency between the new power cell, the process returns to ST202, the lowest cost power cell is selected as the connection partner and the process ends.

After the connection partner selecting process ST200 ends, a leg operation mode setting process ST300 starts.

Figure 32:
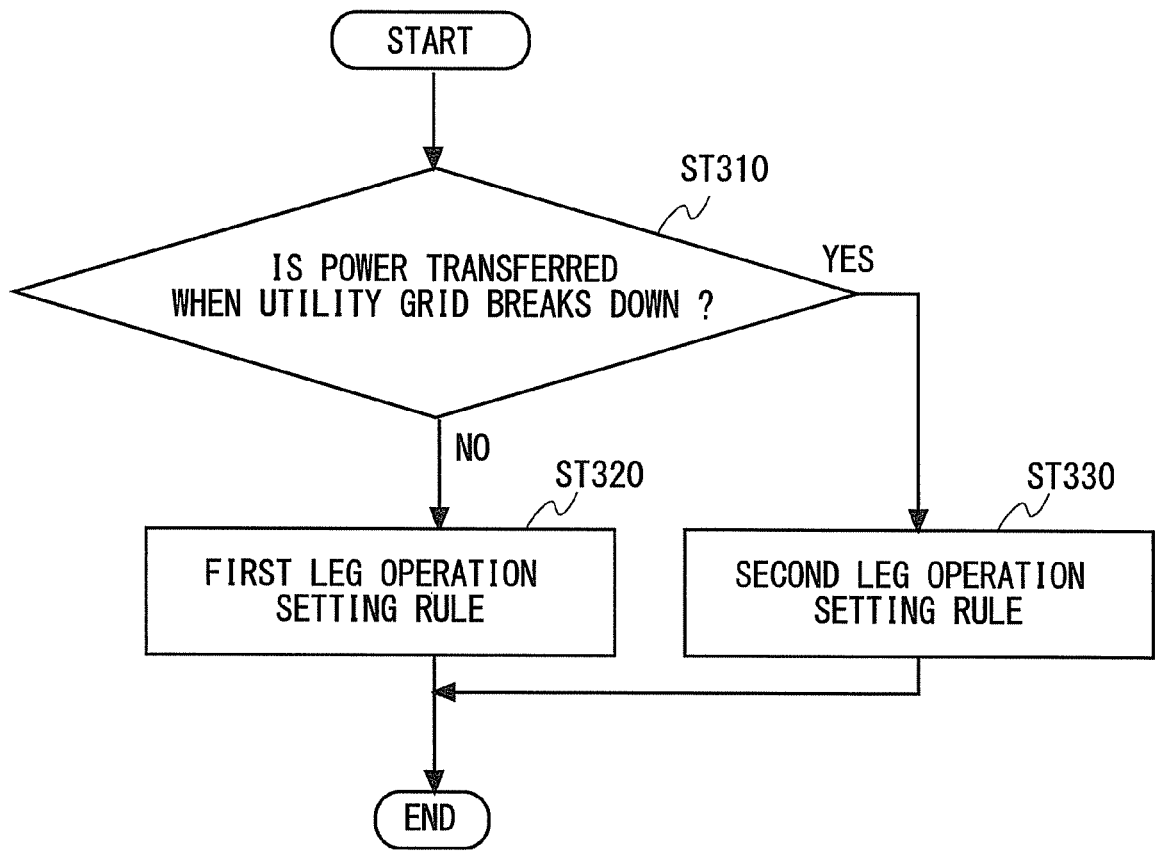
FIG. 32 is a flow chart showing a procedure of a leg operation mode setting process.
Figure 33:
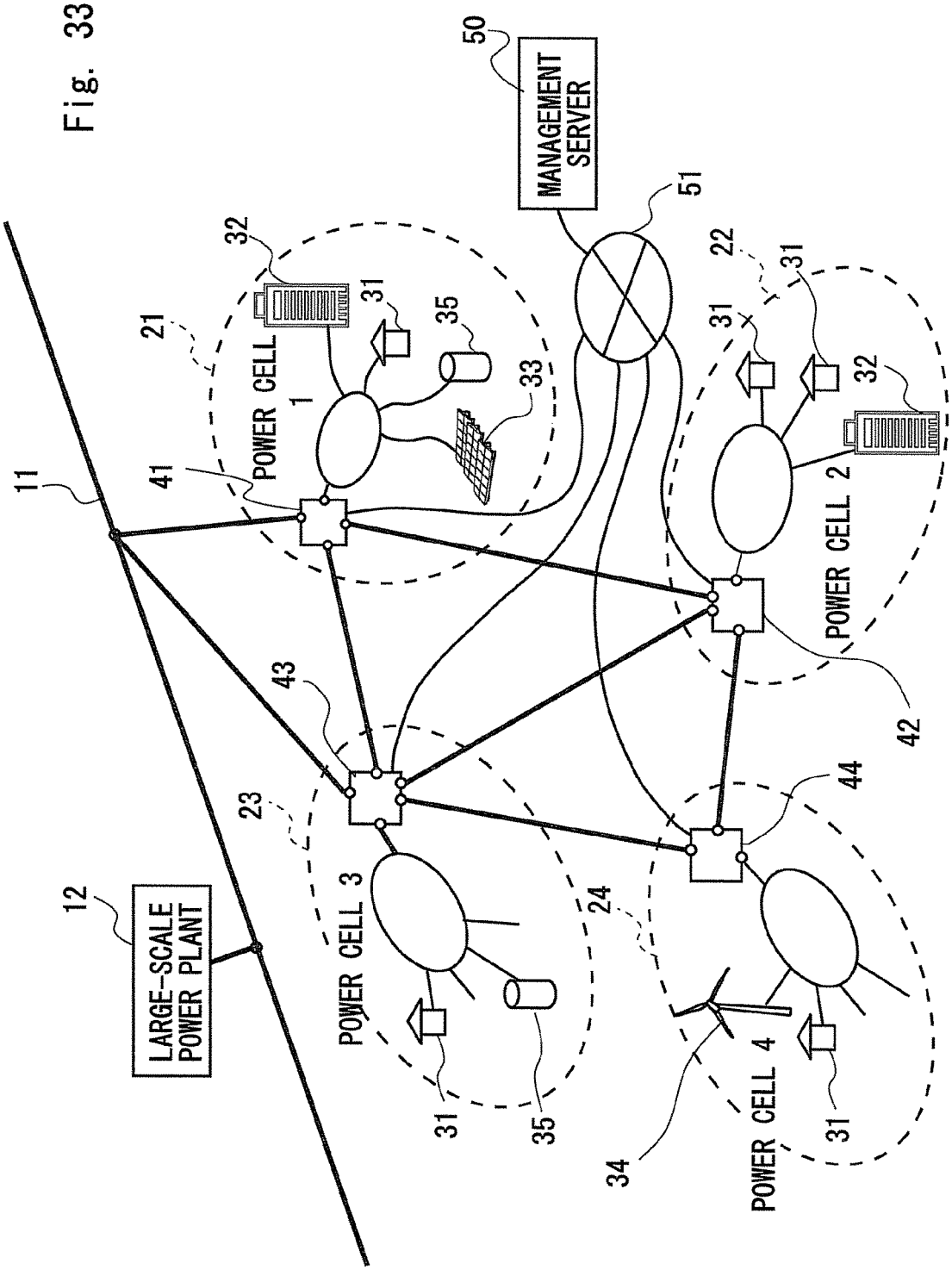
FIG. 33 is a diagram for describing the outline of a power network system.

The flow chart showing the procedure of the leg operation mode setting process ST300 is shown in FIG. 32.

By the processes described above, the connection partner (one or more existing power cells) which connects to the new power cell is determined.

In the leg operation mode setting process ST300, it is determined whether or not the power is transferred between the new power cell and the existing power cell during a power failure (ST310).

If the existing power cell connected to the new power cell has been selected in ST202, it is determined that the power is not transferred between the new power cell and the existing power cell during the power failure. On the other hand, if the existing power cell connected to the new power cell has been selected in ST206 or ST211, it is determined that the power is transferred between the new power cell and the existing power cell during the power failure.

If the power is not transferred between the new power cell and the existing power cell at the power failure (TS310: NO), the operation mode of each leg is set in accordance with a first leg operation setting rule.

The first leg operation setting rule is the following leg operation rule.

It is assumed that the power cell X and the power cell Y are determined to be connected to each other.

(In other words, the power router XR of the power cell X and the power router YR of the power cell Y are connected to each other. More specifically, the leg XRL of the power router XR and the leg YRL of the power router YR are connected to each other.)

(When the power cell X is one of the new power cell and the existing power cell, the power cell Y is the other one of the new power cell and the existing power cell.)

Then, when the utility grid is not down, it is assumed that the power is transferred from the power cell X to the power cell Y.

At this time, the operation mode of the leg XRL of the power router XR and the leg YRL of the power router YR will be set as follows.

When the utility grid is not down, the operation mode of the leg XRL of the power router XR is the designated power transmission/reception mode, and the operation mode of the leg YRL of the power router YR is the stand-alone mode.

Then, when the utility grid goes down and a power failure occurs, the operation of the leg XRL of the power router XR and the leg YRL of the power router YR is stopped.

However, in the power router XR and the power router YR, if there is a leg that is connected to the distributed power supply, the operation mode of the leg that is connected to the distributed power supply is changed to the master mode at the time of the power failure.

In short, the transmission side of the power is made to be the designated power transmission/reception mode, and the reception side of the power is made to be the stand-alone mode.

Further, since the power is not transferred during the power failure of the utility grid, the operation of the leg is stopped during the power failure of the utility grid.

In the first leg operation setting rule, the transmission side of the power is made to be the designated power transmission/reception mode and the reception side of the power is made to be the stand-alone mode because in this case the efficiency of power transmission is better.

It is possible to operate even if the transmission side of the power is made to be the stand-alone mode and the reception side of the power is made to be the designated power transmission/reception mode, and the setting of such operation mode is not excluded from the present invention.

On the other hand, when the power is transferred between the new power cell and the existing power cell at the time of the power failure (ST310: YES), the operation mode of each leg is set in accordance with the second leg operation setting rule.

The second leg operation setting rule is the following leg operation rule.

It is assumed that the power cell J and the power cell K are determined to be connected to each other.

(In other words, the power router JR of the power cell J and the power router KR of the power cell K are connected to each other.

More specifically, the leg JRL of the power router JR and the leg KRL of the power router KR are connected to each other.)

(When the power cell X is one of the new power cell and the existing power cell, the power cell Y is the other one of the new power cell and the existing power cell.)

Then, when the utility grid is down, it is assumed that the power is transferred from the power cell J to the power cell K.

At this time, the operation mode of the leg JRL of the power router JR and the leg KRL of the power router KR will be set as follows.

The operation mode of the leg JRL of the power router JR is set to be the stand-alone mode.

The operation mode of the leg KRL of the power router KR, when the utility grid does not lose power, is the designated power transmission/reception mode.

When the utility grid loses power, the operation mode of the leg KRL of the power router KR is changed to from the designated power transmission/reception mode to the master mode.

(Even if the utility grid loses power, the operation mode of the leg JRL of the power router JR may remain in the stand-alone mode.

In the power router JR, if there is a leg that is connected to the distributed power supply, the operation mode of the leg that is connected to the distributed power supply is changed to the master mode when the utility grid loses power.)

By setting the operation mode of each leg in accordance with the second leg operating setting rule, it is possible to respond promptly to the power failure.

In other words, even if the utility grid is down, it is only necessary to change the operation mode of the leg KRL from the designated power transmission/reception mode to the master mode only in the power router of the reception side (the power router KR).

(In the transmission side, the operation mode of the leg may not be changed.)

Therefore, even if the power cell K does not have excessive power, and the utility grid loses power, it is possible to maintain the voltage of the DC bus of the power router K with the rated voltage by the power transferred from the power cell J and to avoid a situation where the power cell K undergoes a power failure.

With the above process, upon providing the new power cell, it is possible to select an appropriate connection partner.

Therefore, even if the utility grid is down, it is possible to perform the power transfer between the power cells appropriately, and to avoid a situation where a large-scale power failure occurs in the whole or in the wide sphere of the power network.

Further, since the power is allowed to be transferred between the power cells during the power failure, there is no need to invest excessive capital for providing, for example, a distributed power supply such as storage batteries and power generation facilities in the entire power cell.

Then, by setting the operating mode of the legs in a proper manner, it is possible to respond to the power failure promptly, and to avoid a situation where the power cell undergoes the power failure as much as possible.

Note that the present invention is not limited to the exemplary embodiments stated above, and may be changed as appropriate without departing from the spirit of the present invention.

In the above-mentioned ST206, although the lowest cost power cell is selected as the connection partner of the new power cell, the one with the highest demanded power among the existing power cells which meet the first condition group may be selected as the connection partner of the new power cell.

Or, the power cell with the highest absolute value of excessive power among the existing power cells which meets the first condition group may be selected as the connection partner of the new power cell.

It is considered that providing the function for creating and storing the information table of the existing power network, the information table of the new power cell and the general information table in the management server 50 is the most efficient the system design, however, the above-mentioned table may be created and stored by a computer other than the management server 50.

Each process of the process flow described in FIG. 25 to FIG. 32 may be calculated and determined by a person (operator) in accordance with the predetermined manual. Of course, the operation program for the power network may be created in advance, and each process described above may be performed automatically by the computer.

The operation program of the power network system may be distributed in a state where it is recorded on a computer-readable non-volatile storage medium, or it may be installed in the computer by being prepared to be downloaded by wire or wirelessly.

The storage batteries may be replaced in the distributed power supplies, including the power generation facilities.

In the above description, all the power cells are connected to the utility grid, and the power cells are to receive the power from the utility grid during a normal operation. Further, the state that the utility grid is down is called a power failure.

Rather than receiving the power from the utility grid during a normal operation, a plurality of power cells could receive the power from the (big) distributed power supply even in a normal operation. In this case, the power failure means that the (big) distributed power supply which is a source of this power is down.

Although embodiments of the present invention are described specifically in the foregoing, the present invention is not restricted to the above-described embodiments. Various changes which is recognized by those skilled in the art may be made without departing from the scope of the invention.

This application is based upon and claims the benefit of priority from Japanese patent application No. 2013-004770, filed on Jan. 15, 2013, the disclosure of which is incorporated herein in its entirety by reference.

REFERENCE SIGNS LIST

10 POWER NETWORK SYSTEM
11 UTILITY GRID
12 LARGE SCALE POWER PLANT
21 POWER CELL
30 LOAD
31 HOUSE
32 BUILDING
33 SOLAR PANEL
34 WIND POWER GENERATOR

35 POWER STORAGE UNIT (STORAGE BATTERY)
41 POWER ROUTER
50 MANAGEMENT SERVER
51 COMMUNICATION NETWORK
100 POWER ROUTER
101 DIRECT CURRENT BUS
102 SMOOTHING CAPACITOR
103 VOLTAGE SENSOR
110 LEG
111 POWER CONVERSION UNIT
111D FEEDBACK DIODE
111P ANTIPARALLEL CIRCUIT
111T THYRISTOR
112 CURRENT SENSOR
113 SWITCH
114 VOLTAGE SENSOR
115 CONNECTION TERMINAL.

The invention claimed is:

1. A method for operating a power network system which includes a plurality of power cells having a power router for connecting to an external power system asynchronously and is constituted by connecting the plurality of power cells,
wherein
the power router includes;
a direct current bus maintaining a voltage at a predetermined rated voltage, and
a power conversion leg having one connection end which is connected to the direct current bus and the other connection end which is connected to an external connection partner as an external connection terminal, and having a function of converting the power bi-directionally between the one connection end and the other connection end, and
wherein
the power conversion leg is operatively controlled in either one operation mode out of
a master mode if the voltage of the direct current bus decrease from the rated voltage, a shortage of the power is compensate from the connection partner, and if the voltage of the direct current bus increase from the rated voltage, an excessive of the power is transferred to the connection partner,
a designate power transmission/reception mode in which a designated power is transferred to the connection partner or the designated power is received from the connection partner, and
a stand-alone mode in which a voltage with designated amplitude and frequency is produced by itself and is transferred/received between the connection partner,
characterized in that
in case a first power conversion leg of a first power router and a second power conversion leg of a second power router are connected, the first power router and the second power router cannot receive a power supply from the utility grid, and the power is transferred by transmitting electricity from the first power conversion leg of the first power router to the second power conversion leg of the second power router,
when there is the power supply from the utility grid,
the operation mode of the first power conversion leg of the first power router is set to the stand-alone, and
the operation mode of the second power conversion leg of a second power router is set to the designate power transmission/reception mode,
when there is not the power supply from the utility grid,
the operation mode of the first power conversion leg of the first power router is set to the stand-alone, and the operation mode of the second power conversion leg of the second power router is set to the master mode.

2. The method for operating a power network system according to claim 1, characterized in that when there is not the power supply from the utility grid in the first router, the power conversion leg which is connected to a distributed power supply is set to the master mode.

3. A power network system which includes a plurality of power cells having a power router for connecting to an external power system asynchronously and is constituted by connecting the plurality of power cells,
wherein
the power router includes;
a direct current bus maintaining a voltage at a predetermined rated voltage, and
a power conversion leg having one connection end which is connected to the direct current bus and the other connection end which is connected to an external connection partner as an external connection terminal, and having a function of converting the power bi-directionally between the one connection end and the other connection end, and
wherein
the power conversion leg is operatively controlled in either one operation mode out of
a master mode if the voltage of the direct current bus decrease from the rated voltage, a shortage of the power is compensate from the connection partner, and if the voltage of the direct current bus increase from the rated voltage, an excessive of the power is transferred to the connection partner,
a designate power transmission/reception mode in which a designated power is transferred to the connection partner or the designated power is received from the connection partner, and
a stand-alone mode in which a voltage with designated amplitude and frequency is produced by itself and is transferred/received between the connection partner,
characterized in that
in case a third power conversion leg of a third power router and a fourth power conversion leg of a fourth power router are connected, and if the third power router and the fourth power router can receive a power supply from the utility grid, the power is transferred from the third power conversion leg of the third power router to the fourth power conversion leg of the fourth power router, and if the third power router and the fourth power router cannot receive the power supply from the utility grid, the power is not transferred from the third power conversion leg of the third power router to the fourth power conversion leg of the fourth power router,
when there is the power supply from the utility grid,
the operation mode of the third power conversion leg of the third power router is set to the designate power transmission/reception mode, and
the operation mode of the fourth power conversion leg of the fourth power router is set to the stand-alone mode,
when there is not the power supply from the utility grid,
an operation of the third power conversion leg of the third power router and the fourth power conversion leg of the fourth power router is stopped.

4. The method for operating a power network system according to claim 3, characterized in that when there is not the power supply from the utility grid in the third router and the fourth router, the power conversion leg which is connected to a distributed power supply is set to the master mode.

\* \* \* \* \*